US009118977B2

(12) United States Patent
Onishi

(10) Patent No.: US 9,118,977 B2
(45) Date of Patent: *Aug. 25, 2015

(54) CONTENT SYNCHRONIZATION SYSTEM, CONTENT-SYNCHRONIZATION CONTROL DEVICE, AND CONTENT PLAYBACK DEVICE

(75) Inventor: Takeo Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/346,595

(22) PCT Filed: Sep. 12, 2012

(86) PCT No.: PCT/JP2012/005797
§ 371 (c)(1),
(2), (4) Date: Mar. 21, 2014

(87) PCT Pub. No.: WO2013/046571
PCT Pub. Date: Apr. 4, 2013

(65) Prior Publication Data
US 2014/0237523 A1 Aug. 21, 2014

(30) Foreign Application Priority Data

Sep. 26, 2011 (JP) .................................. 2011-208492

(51) Int. Cl.
*H04N 7/173* (2011.01)
*H04N 21/6587* (2011.01)
(Continued)

(52) U.S. Cl.
CPC ........... *H04N 21/6587* (2013.01); *H04N 7/173* (2013.01); *H04N 21/242* (2013.01); *H04N 21/6125* (2013.01); *H04N 21/6175* (2013.01); *H04N 21/8547* (2013.01)

(58) Field of Classification Search
USPC ....................... 725/86–91, 100–103
See application file for complete search history.

(56) References Cited

U.S. PATENT DOCUMENTS 8,316,154 B2 * 11/2012 Yoneda .......................... 709/248
2007/0136769 A1 * 6/2007 Goldberg et al. ............... 725/81
(Continued)

FOREIGN PATENT DOCUMENTS

JP 2008-071258 A 3/2008
JP 2009-268141 A 11/2009
(Continued)

OTHER PUBLICATIONS

International Search Report corresponding to International Application No. PCT/JP2012/005797 dated Dec. 18, 2012 (3 pgs).
(Continued)

*Primary Examiner* — Mulugeta Mengesha
(74) *Attorney, Agent, or Firm* — Wilmer Cutler Pickering Hale and Dorr LLP

(57) ABSTRACT

A content synchronization system can be provided with which, under HTTP, a content-synchronization control device can control each content playback device so that content control is synchronized in multiple content playback devices. Inquiry reception means 82 receives an inquiry for determining presence/absence of playback control command transmitted from each content playback device 90 to the content playback device. The waiting time determination means 83 determines a waiting time from when the content playback device of the source of transmission of inquiry receives an inquiry response to when it transmits a subsequent inquiry so that the reception time of the inquiry transmitted from each content playback device 90 is at the same time, on the basis of the reference of the reception cycle of the inquiry. The inquiry response transmission means 85 returns the inquiry response including the waiting time back to the content playback device. At this occasion, when the playback control command and the start time of the control are determined, the information thereof is also included in the inquiry response.

18 Claims, 14 Drawing Sheets

(51) Int. Cl.
*H04N 21/242* (2011.01)
*H04N 21/61* (2011.01)
*H04N 21/8547* (2011.01)

(56) References Cited

U.S. PATENT DOCUMENTS

2008/0177822 A1* 7/2008 Yoneda .......................... 709/202
2010/0111491 A1* 5/2010 Kamoto ........................... 386/66
2012/0042047 A1* 2/2012 Chen et al. ..................... 709/219

FOREIGN PATENT DOCUMENTS

| JP | 2010-206349 A | 9/2010 |
| JP | 2011-501260 A | 1/2011 |
| JP | 2011-035503 A | 2/2011 |

OTHER PUBLICATIONS

Carbou, Mathieu, "Reverse Ajax: Dai 1 Kai Comet no Shokai," [online], Aug. 26, 2011 [retrieval date Dec. 7, 2012], Internet <URL: http://www.ibm.com/developerworks/jp/web/library/wa-reverseajax1/>.

* cited by examiner

FIG. 3

| CLIENT TERMINAL IDENTIFIER | COMMUNICATION DELAY (ms) | PREVIOUS INQUIRY RESPONSE TRANSMISSION TIME (ms) |
|---|---|---|
| 20a | 10 | 1308637151322 |
| 20b | 200 | 1308637151332 |

FIG. 4

[EXAMPLE 1]
command = pause

[EXAMPLE 2]
command = seek
position = 2300

[EXAMPLE 3]
command = forward
speed = 4

FIG. 5

[EXAMPLE 1]
command = pause
time = 1308637152032

[EXAMPLE 2]
command = seek
position = 2300
time = 1308637165983

[EXAMPLE 3]
command = forward
speed = 4
time = 1308637178111

FIG. 6

| CLIENT TERMINAL THAT HAS NOT YET PERFORM TRANSMISSION | PLAYBACK CONTROL COMMAND, OR PLAYBACK CONTROL INFORMATION |
|---|---|
| 20a, 20b | command = pause |

| CLIENT TERMINAL THAT HAS NOT YET PERFORM TRANSMISSION | PLAYBACK CONTROL COMMAND, OR PLAYBACK CONTROL INFORMATION |
|---|---|
| 20b | command = pause<br>time = 1308637152032 |

CONTENT SYNCHRONIZATION SYSTEM, CONTENT-SYNCHRONIZATION CONTROL DEVICE, AND CONTENT PLAYBACK DEVICE

CROSS-REFERENCE TO RELATED APPLICATIONS

This application is a national stage application of International Application No. PCT/JP2012/005797 entitled "Content Synchronization System, Content-Synchronization Control Device, and Content Playback Device," filed on Sep. 12, 2012, which claims the benefit of the priority of Japanese patent application No. 2011-208492, filed on Sep. 26, 2011, the disclosures of each of which are hereby incorporated by reference in their entirety.

TECHNICAL FIELD

The present invention relates to a content synchronization system for synchronizing content control in multiple content playback devices, and also relates to a content-synchronization control device, a content playback device, a content synchronization method, a content-synchronization control method, a content playback method, a content-synchronization control program, and a content playback program which are applied to the content synchronization system.

BACKGROUND ART

Various techniques for reproducing the same content by synchronizing the content in multiple information processing devices have been suggested (for example, see PLT 1 to 3).

For example, in the technique described in PLT 1, a master terminal calculates an encoded video decoding start time. At this occasion, the master terminal calculates, as a decoding start time, a time obtained by adding the maximum time from when a decoding start command is transmitted from the master terminal to when it reaches the slave terminal to the time of the radio wave clock. The master terminal transmits the decoding start time to all the slave terminals. Then, when the time indicated by the radio wave clock becomes the decoding start time, all the slave terminals start decoding encoded video.

For example, according to the technique described in PLT 2, one parent station transmits content ID, control type information, control start information, control start command to multiple terminal stations. Then, the terminal station starts control of the content designated by the content ID at a time designated by the control start information. At this occasion, the terminal station controls the content in accordance with the control content designated by the control type information. Examples of control type information include "reproducing content data", "fast-forward content data", and the like.

For example, PLT 3 indicates that the user computer reproducing the content commands another user computer to change flow of video data by enabling at least one of the functions of "stop", "pause", "fast-reverse", and "fast-forward" of the video data. PTL 3 describes, at this occasion, a mode in which the user computer transmits a command to another user computer in a form of peer-to-peer and a mode in which a command is transmitted via a content providing device such as a server.

PLT 3 describes HTTP (hypertext transfer protocol) as a standard of data transmission in a computer network.

CITATION LIST

Patent Literature

PLT 1: JP 2011-35503 A (paragraphs 0012, 0013, 0032)
PLT 2: JP 2009-268141 A (paragraphs 0051, 0034, 0038 to 0050)
PLT 3: Japanese Translation of PCT application No. 2011-501260 (paragraphs 0030, 0039, 0040, FIG. 1, paragraph 0032)

SUMMARY OF INVENTION

Technical Problem

In the technique described in PLT 1, the maximum time from when the decoding start command is transmitted from the master terminal to when it is received by the slave terminal is added to the time of the radio wave clock, whereby the decoding start times of all the slave terminals can be calculated. As a result, playback of the video on all the slave terminals can be started at a time.

However, when a server/client system including an HTTP server and an HTTP client is applied to the technique described in PLT 1, there is a problem in that the server cannot appropriately determine a time when each client executes various commands (for example, playback, stop, and the like) concerning content playback at a time (playback control time). Hereinafter, this feature will be explained more specifically.

In order to synchronize the content playback by each client in response to operation with any one of the clients in the HTTP server/client system, it is necessary for each client to perform polling with the server. The polling is communication method in which the client inquires of the server as to whether there is information which is to be transmitted from the server to the client with a regular interval of time, and the server transmits information which is to be transmitted to the client in accordance with the inquiry. More specifically, in order to synchronize the content playback in each client in response to operation with any one of the clients, even if the server determines the playback control time, the server can transmit the playback control information only in the mode in which the server responds to the HTTP request from the client. Therefore, even if the playback control time is determined on the basis of the maximum time it takes for the playback control information to be delivered from the server to the client, the time when the client sends HTTP request to the server may be later than the playback control time, and when the client sends inquiry, the playback control time may be already over.

In this case, when a time obtained by adding a polling cycle to a time defined on the basis of the maximum time it takes for the playback control information to be delivered from the server to the client is defined as the playback control time, a time when the client sends the HTTP request is prevented from being later than the playback control time. However, in this case, the playback control time is delayed due to the polling cycle added.

In a case where HTTP is applied to the technique (PLT 3) for transmitting a command concerning video data by a user computer to another user computer, the user computer which transmits the command cannot recognize the time at which the computer receiving the command transmits the HTTP request to the server in the mode in which the command is transmitted via a content providing device such as the server.

For this reason, the user computer which transmits the command cannot calculate the playback control time.

Accordingly, it is an object of the present invention to provide a content synchronization system in which, under HTTP, a content-synchronization control device can control each content playback device so that content control is synchronized in multiple content playback devices, and to provide a content-synchronization control device, a content playback device, a content synchronization method, a content-synchronization control method, a content playback method, a content-synchronization control program, and a content playback program which are applied to the content synchronization system.

Solution to Problem

A content synchronization system according to the present invention includes a plurality of content playback devices configured to play a content, and a content-synchronization control device for synchronizing content control with the plurality of content playback devices, wherein the content-synchronization control device includes request information reception means configured to receive, from each content playback device, request information for requesting each content playback device to execute a playback control command which is a command concerning playback control of the content in a synchronized manner, inquiry reception means configured to receive an inquiry for determining presence/absence of playback control command transmitted to the content playback device from each content playback device, waiting time determination means configured to determine a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry, start time determination means, wherein in a case where when the inquiry reception means receives the inquiry, the request information reception means already received the request information and the start time of the content control with each content playback device according to the playback control command indicated by the request information is not yet determined, the start time determination means determines the start time, and inquiry response transmission means configured to transmit, to the content playback device, an inquiry response including the waiting time determined with regard to the content playback device of the source of transmission of inquiry, wherein in a case where when the inquiry reception means receives the inquiry, the request information reception means already received the request information and the start time is determined, the inquiry response transmission means transmits the inquiry response including the playback control information including the information about the start time and the playback control command indicated by the request information, and each content playback device includes request information transmission means configured to transmit the request information to the content-synchronization control device, inquiry transmission means configured to transmit the inquiry to the content-synchronization control device, inquiry response reception means configured to receive an inquiry response transmitted by the inquiry, response transmission means in response to the inquiry, inquiry transmission control means configured to transmit a subsequent inquiry to the inquiry transmission means with timing according to the waiting time indicated by the inquiry response, and playback control means, wherein when the inquiry response includes playback control information, the playback control means starts the content control based on the playback control command indicated by the playback control information at the start time indicated by the playback control information.

A content-synchronization control device according to the present invention includes request information reception means configured to receive, from each content playback device, request information for requesting each content playback device to execute a playback control command which is a command concerning playback control of the content in a synchronized manner, inquiry reception means configured to receive an inquiry for determining presence/absence of playback control command transmitted to the content playback device from each content playback device, waiting time determination means configured to determine a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry, start time determination means, wherein in a case where when the inquiry reception means receives the inquiry, the request information reception means already received the request information and the start time of the content control with each content playback device according to the playback control command indicated by the request information is not yet determined, the start time determination means determines the start time, and inquiry response transmission means configured to transmit, to the content playback device, an inquiry response including the waiting time determined with regard to the content playback device of the source of transmission of inquiry, wherein in a case where when the inquiry reception means receives the inquiry, the request information reception means already received the request information and the start time is determined, the inquiry response transmission means transmits the inquiry response including the playback control information including the information about the start time and the playback control command indicated by the request information.

A content playback device according to the present invention is a content playback device for playing a content, including request information transmission means configured to transmit request information for requesting each content playback device to execute a playback control command which is a command concerning playback control of the content in a synchronized manner, to the content-synchronization control device for synchronizing content control in a plurality of content playback devices, inquiry transmission means configured to transmit, to the content-synchronization control device, an inquiry for determining presence/absence of playback control command transmitted to the content playback device, inquiry response reception means configured to receive an inquiry response which is transmitted by the content-synchronization control device in response to the inquiry and which includes information about a waiting time after the inquiry response is received, inquiry transmission control means configured to transmit a subsequent inquiry to the inquiry transmission means with timing according to the waiting time, and playback control means, wherein when the inquiry response includes the playback control command and the information about the start time of the content control according to the playback control command, the playback control means starts the content control based on the playback control command at the start time.

A content synchronization method according to the present invention is a content synchronization method in which when any one of a plurality of content playback devices for playing a content transmits request information for requesting each content playback device to execute a playback control command which is a command concerning playback control of the content in a synchronized manner, a content-synchronization control device for synchronizing content control with the plurality of content playback devices receives the request information, each content playback device transmits, to the content-synchronization control device, an inquiry for determining presence/absence of playback control command transmitted to the content playback device, when the content-synchronization control device receives an inquiry, the content-synchronization control device determines a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry, in a case where when the content-synchronization control device receives the inquiry, the content-synchronization control device already received the request information and the start time of the content control with each content playback device according to the playback control command indicated by the request information is not yet determined, the content-synchronization control device determines the start time, the content-synchronization control device transmits, to the content playback device of the source of transmission of inquiry, an inquiry response including the waiting time, in a case where when the content-synchronization control device receives the inquiry, the content-synchronization control device already received the request information and the start time is determined, the content-synchronization control device transmits the inquiry response including the playback control information including the information about the start time and the playback control command indicated by the request information, when the inquiry response is transmitted, when each content playback device transmits the inquiry and thereafter receives the inquiry response corresponding to the inquiry from the content-synchronization control device, the content playback device transmits a subsequent inquiry with timing according to the waiting time indicated by the inquiry response, and when the inquiry response includes the playback control information, each content playback device starts the content control based on the playback control command indicated by the playback control information at the start time indicated by the playback control information.

A content-synchronization control method according to the present invention is a content-synchronization control method in which when any one of a plurality of content playback devices for playing a content transmits request information for requesting each content playback device to execute a playback control command which is a command concerning playback control of the content in a synchronized manner, a content-synchronization control device for synchronizing content control with the plurality of content playback devices receives the request information, wherein the content-synchronization control device receives an inquiry for determining presence/absence of playback control command transmitted to the content playback device from each content playback device, determines, when the inquiry from the content playback device is received, a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry, determines the start time in a case where when the inquiry is received, the request information is already received and the start time of the content control with each content playback device according to the playback control command indicated by the request information is not yet determined, and transmits, to the content playback device of the source of transmission of inquiry, an inquiry response including the waiting time, wherein in a case where when the content-synchronization control device receives the inquiry, the content-synchronization control device already received the request information and the start time is determined, the content-synchronization control device transmits the inquiry response including the playback control information including the information about the start time and the playback control command indicated by the request information, when the inquiry response is transmitted.

A content playback method according to the present invention is a content playback method, wherein a content playback device for playing a content, transmits request information for requesting each content playback device to execute a playback control command which is a command concerning playback control of the content in a synchronized manner, to the content-synchronization control device for synchronizing content control in a plurality of content playback devices, transmits, to the content-synchronization control device, an inquiry for determining presence/absence of playback control command transmitted to the content playback device, receives an inquiry response which is transmitted by the content-synchronization control device in response to the inquiry and which includes information about a waiting time after the inquiry response is received, transmits a subsequent inquiry with timing according to the waiting time, and when the inquiry response includes the playback control command and the information about the start time of the content control according to the playback control command, the content playback device starts the content control based on the playback control command at the start time.

A content-synchronization control program according to the present invention is a content-synchronization control program for causing a computer to perform request information reception processing for receiving, from each content playback device, request information for requesting each content playback device to execute a playback control command which is a command concerning playback control of the content in a synchronized manner, inquiry reception processing for receiving an inquiry for determining presence/absence of playback control command transmitted to the content playback device from each content playback device, waiting time determination processing for determining a waiting time from when the content playback device of the source of transmission of inquiry receives an inquiry response which is a response from the computer in reply to the inquiry to when it transmits a subsequent inquiry so that the reception time of the inquiry transmitted from each content playback device is at the same time, on the basis of a cycle reference value determined as a reference of a reception cycle of the inquiry, start time determination processing, wherein in a case where when the inquiry is received, the request information is already received and the start time of the content control with each content playback device according to the playback control command indicated by the request information is not yet determined, determining the start time, and inquiry response transmission processing for transmitting, to the content playback device, an inquiry response including the waiting time determined with regard to the content playback device of the source of transmission of inquiry, wherein, in inquiry response transmission processing, in a case where when the inquiry is received, the request information is already received and the start time is determined, the inquiry response including the playback control information including the information about the start time and the playback control command indicated by the request information is transmitted.

A content playback program according to the present invention is a content playback program for causing a computer to execute request information transmission processing for transmitting, to the content synchronization control device for synchronizing content control in a plurality of computers, request information for requesting each content playback device to execute a playback control command which is a command concerning playback control of the content in a synchronized manner in the plurality of computers, inquiry transmission processing for transmitting, to the content synchronization control device, an inquiry for determining presence/absence of playback control command transmitted to the computer, inquiry response reception processing for receiving an inquiry response which is transmitted by the content-synchronization control device in response to the inquiry and which includes information about the waiting time after the inquiry response reception, processing for transmitting the inquiry again to the content-synchronization control device with timing according to the waiting time, and playback control processing, wherein when the inquiry response includes the playback control command and the information about the start time of the content control according to the playback control command, the content control based on the playback control command is started at the start time.

Advantageous Effects of Invention

According to the present invention, under HTTP, a content-synchronization control device can control each content playback device so that content control is synchronized in multiple content playback devices.

BRIEF DESCRIPTION OF DRAWINGS

FIG. 3 It depicts an explanatory diagram illustrating an example of communication delay information held by communication delay management means 104.
FIG. 4 It depicts an explanatory diagram illustrating an example of playback control command.
FIG. 5 It depicts an explanatory diagram illustrating an example of playback control information generated by control time determination means 106.
FIG. 6 It depicts an explanatory diagram illustrating an example of information stored by control information management means 107.

DESCRIPTION OF EMBODIMENTS

Exemplary embodiments of the present invention will be hereinafter explained with reference to drawings.

First Exemplary Embodiment

Figure 1:
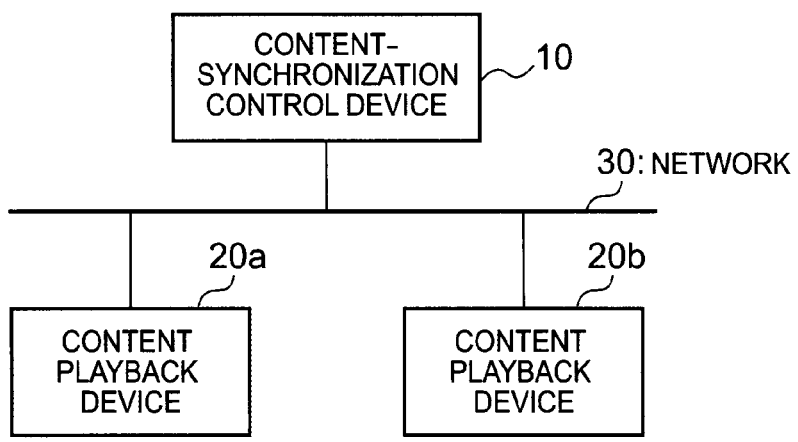
FIG. 1 It depicts a block diagram illustrating an example of a content synchronization system of a first exemplary embodiment of the present invention.

FIG. 1 is a block diagram illustrating an example of a content synchronization system of a first exemplary embodiment of the present invention. A content synchronization system of the first exemplary embodiment includes a content-synchronization control device 10 and multiple content playback devices 20a, 20b. FIG. 1 illustrates two content playback devices 20a, 20b, but three or more content playback devices may be provided. The content-synchronization control device 10 and the multiple content playback devices 20a, 20b are connected via a network 30. The content-synchronization control device 10 and the multiple content playback devices 20a, 20b communicate according to HTTP. The content-synchronization control device 10 is a server in the server/client system, and is hereinafter referred to as a server 10. Each of the content playback devices 20a, 20b is a client in the server/client system, and are hereinafter referred to as client terminals 20a, 20b.

The client terminals 20a, 20b are, for example, terminals located away from each other, but the physical distance between the client terminals is not particularly limited.

The client terminals 20a, 20b, for example, reproduce a content on a generally-used browser.

The client terminals 20a, 20b download, for example, the same content from the server 10, and each of them reproduces the content. It should be noted that the content may be either motion picture or sound. The server 10 controls each of the client terminals 20a, 20b, so that, each of the client terminals 20a, 20b executes various commands of the content playback (for example, commands such as playback start, pause, and the like) at the same time. Hereinafter, a command concerning content playback control will be referred to as a playback control command. The server 10 determines a time when each of the client terminals 20a, 20b starts content control based on playback control command (which may be hereinafter referred to as control start time), and transmits playback control information, which is information including a control start time thereof and a playback control command, to each of the client terminals 20a, 20b. However, HTTP is used for communication between the server 10 and the client terminals 20a, 20b. Therefore, the server 10 receives an inquiry for determining presence/absence of playback control command (HTTP request) from each client terminal, and when, at that occasion, there is a playback control command for a client terminal of the source of the inquiry, the server 10 transmits a response to the inquiry to the client terminal of the source of the inquiry in such a manner that the playback control information (information about playback control command and control start time) is included in the response to the inquiry. When the response transmitted by the server 10 in reply to the inquiry to the server 10 includes the playback control information, the client terminals 20a, 20b starts content control based on the playback control command at the control start time designated by the playback control information. As a result, various kinds of operations about playback such as playback and pause with the client terminals 20a, 20b are synchronized. Hereinafter, the response transmitted by the server 10 in reply to the inquiry for determining presence/absence of the playback control command transmitted from the client terminal will be referred to as an inquiry response. The content control may also be referred to as control of the playback state of the content.

The server 10 makes the inquiry response including a waiting time from when the client terminal receives the inquiry response to when a subsequent inquiry is transmitted. When a designated waiting time passes since the client terminals 20a, 20b receive the inquiry response, the client terminals 20a, 20b transmits an inquiry for determining presence/absence of playback control command to the server 10 again. As a result, each of the client terminals 20a, 20b repeatedly transmits inquiry for determining presence/absence of playback control command to the server 10.

Figure 2:
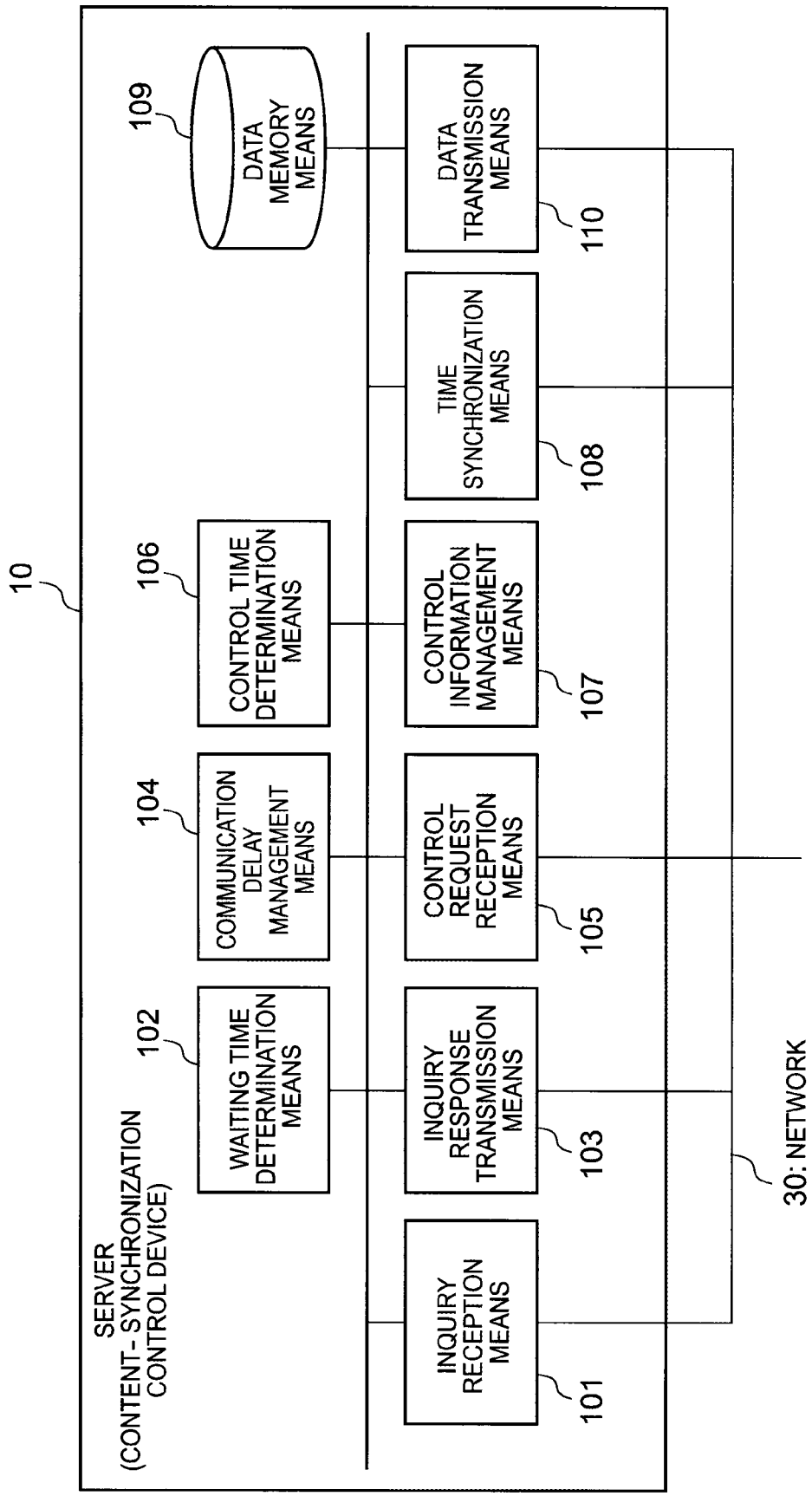
FIG. 2 It depicts a block diagram illustrating an example of configuration of a content-synchronization control device according to the first exemplary embodiment.

FIG. 2 is a block diagram illustrating an example of configuration of a server (content-synchronization control device) 10 according to the first exemplary embodiment. The server 10 includes inquiry reception means 101, waiting time determination means 102, inquiry response transmission means 103, communication delay management means 104, control request reception means 105, control time determination means 106, control information management means 107, time synchronization means 108, data memory means 109, and data transmission means 110. The server 10 is connected to a client terminal (not shown in FIG. 2) via the network 30.

The inquiry reception means 101 receives the inquiry for determining presence/absence of playback control command which has not yet transmitted to the client terminal from each of the client terminals 20a, 20b. It should be noted that each of the clients 20a, 20b may transmit an inquiry to the server 10 by, for example, GET method of HTTP.

The waiting time determination means 102 determines, with regard to the client terminal that transmitted the inquiry for determining presence/absence of playback control command, a waiting time from when the client terminal receives an inquiry response to when the client terminal transmits a subsequent inquiry. The waiting time determination means 102 determines the waiting time so that the reception time of a subsequent inquiry is the same as the reception time of an inquiry from another client terminal, on the basis of the time when the inquiry reception means 101 receives the inquiry from the client terminal. The determination method of the waiting time will be explained later.

The inquiry response transmission means 103 transmits a response in reply to the inquiry received by the inquiry reception means 101 to the client terminal which is the source of transmission of the inquiry. The inquiry response transmission means 103 incorporates, into the inquiry response, at least information about the waiting time determined by the waiting time determination means 102. When a playback control command transmitted to the client terminal of the source of transmission of the inquiry has not yet been transmitted, the inquiry response transmission means 103 incorporates the playback control command into the inquiry response. The playback control command is included in the inquiry response as the playback control information. The playback control information is generated by the control time determination means 106.

The communication delay management means 104 holds the communication delay information. The communication delay information includes at least the identifier of the client terminal and communication delay between the client terminal and the server 10. The communication delay is a time required by two-way communication between the client terminal and the server 10. In the explanation about the present invention, "communication delay" and "communication delay information" including the communication delay are distinguished from each other. FIG. 3 is an explanatory diagram illustrating an example of communication delay information held by communication delay management means 104. FIG. 3 shows a case where the communication delay information is information for associating, for each client terminal, the identifier of the client terminal, the communication delay, and the previous inquiry response transmission time to the client terminal. The first column shown in FIG. 3 is the identifier of the client terminal. In this example, reference numerals "20a", "20b" as shown in FIG. 1 are indicated as identifiers. The second column as shown in FIG. 3 is the communication delay, and, in this example, this is indicated in units of milliseconds. The third column as shown in FIG. 3 is the previous inquiry response transmission time for the client terminal. This time is used to measure the communication delay. In the present exemplary embodiment, the time is represented by an elapsed time since a predetermined reference point in time previously defined. In this example, 0:0:0 on Jan. 1, 1970 of Greenwich mean time is adopted as a reference point in time, and the elapsed time since the reference point in time is represented in milliseconds to represent the time. However, other times may be used as the reference point in time. The elapsed time since the reference point in time may be represented in a unit other than milliseconds. However, the unit of the communication delay and the unit of the elapsed time since the reference point in time are preferably of the same unit (in this example, milliseconds).

The communication delay management means 104 uses, for example, the inquiry from the client terminal and the response in reply to the inquiry to measure the communication delay. This measurement method will be explained using a specific example. For example, when the inquiry reception means 101 of the server 10 receives an inquiry from the client terminal 20a, then the inquiry response transmission means 103 transmits an inquiry response to the client terminal 20a. Then, when the inquiry response transmission means 103 transmits the inquiry response, the communication delay management means 104 updates the "previous inquiry response transmission time" corresponding to the client terminal 20a with the transmission time. As described above, every time the inquiry response is transmitted to each of the client terminals, the communication delay management means 104 updates the "previous inquiry response transmission time" corresponding to the client terminal in the communication delay information. After the update, suppose that the content of the communication delay information changes to the content as shown in FIG. 3. Then, when the client terminal 20a receives an inquiry response from the server 10, the client terminal 20a stores the reception time. Thereafter, the client terminal 20a transmits an inquiry to the server 10 again. At that occasion, the client terminal 20a gives, to the inquiry, the elapsed time from when the inquiry response is received to when the inquiry is transmitted. This elapsed time is the same as the waiting time included in the inquiry response. This elapsed time is transmitted as, for example, URL (Uniform Resource Locator) parameter. For example, when the elapsed time is 121 milliseconds, the client terminal 20a gives "time=121" to the URL during the inquiry transmission to make "http://example.com/GetMessage?time=121", whereby the client terminal 20a may transmit, to the server 10, that the elapsed time is 121 milliseconds.

When the inquiry reception means 101 of the server 10 receives an inquiry from the client terminal 20a, the communication delay management means 104 checks the time when the inquiry is received. For example, suppose that this time is "1308637151453". The communication delay management means 104 refers to the "previous inquiry response transmission time" corresponding to the client terminal 20a. In this example, this time is "1308637151322" (see FIG. 3). The communication delay management means 104 can calculate the communication delay as the value obtained by subtracting the previous inquiry response transmission time and the elapsed time notified by the client terminal 20a (in the above example, 121 milliseconds) from the time when the inquiry is received from the client terminal 20a. More specifically, in this example, according to the following expression (1), the communication delay of the client terminal 20a can be calculated as 10 milliseconds.

$$1308637151453 - 1308637151322 - 121 = 10 \qquad \text{expression (1)}$$

When the communication delay management means 104 calculates the communication delay, the communication delay management means 104 updates the communication delay included in the communication delay information held. As described above, when the inquiry reception means 101 receives an inquiry from the client terminal, the communication delay management means 104 calculates the communication delay of the client terminal and updates the communication delay information.

It should be noted that the communication delay management means 104 may measure the communication delay according to the method explained above, adopt, as the communication delay, that the average value of the measurement results obtained from multiple measurements, and update the communication delay included in the communication delay information with the average value thereof. As described above, when the communication delay exceptionally increases due to packet loss, which makes it impossible to correctly measure the normal communication delay, and in such case, such adverse influence can be alleviated by defining the communication delay.

The control request reception means 105 receives the playback control request from each of the client terminals 20a, 20b. The playback control request is request information for requesting control of each client terminal so that a designated playback control command is executed in a synchronous manner in each client terminal. Each client terminal may transmit, to the server 10, the playback control command which is determined in accordance with user's operation as the playback control request. Examples of playback control commands include playback control commands according to various kinds of processing such as playback, pause, fast-forward, fast-reverse, and cue playback. However, the type of playback control command is not limited thereto. The playback control command may be added with supplementary information. The supplementary information is, for example, information designating the execution mode of the command. Examples of supplementary information include a playback speed of the playback control command for commanding the playback, and the cue position of the playback control command commanding the cue playback. The type of supplementary information is not limited thereto.

FIG. 4 is an explanatory diagram illustrating an example of playback control command. In the example as illustrated in FIG. 4, each row is described in a format of "parameter name=parameter value". A parameter value of which parameter name is indicated by "command" represents a playback control command. Then, other parameter names represent supplementary information of the playback control command. In example 1 as illustrated in FIG. 4, a command name "command" is designated in the first row, and the parameter value thereof is "pause", and example 1 is a command for commanding start of pause. In example 2 as illustrated in FIG. 4, a command name "command" is designated in the first row, and the parameter value thereof is "seek", and example 2 is a command for commanding start of cue playback. In example 2, "position=2300" is described in the second row as supplementary information, and this indicates that cue playback is carried out at the position 2300 milliseconds after the start of the motion picture. In example 3 as illustrated in FIG. 4, a command name "command" is designated in the first row, and the parameter value thereof is "forward", and example 3 is a command for commanding start of fast-forward. In example 3, "speed=4" is described in the second row as supplementary information, and this indicates that fast-forward is done at quad-speed.

By adding the supplementary information, the execution mode of the command can be designated, and not only the start timing of the content control in each client terminal but also the execution mode can be aligned. Therefore, even when the execution mode of the command can be changed, each client terminal can output the same portion of the same content in a synchronous manner. For example, when each client terminal performs cue playback, the client terminal starts playback of the content from the same portion, and can output the same portion of the content at the same time.

The playback control command and the supplementary information are not limited to the example as shown in FIG. 4. Moreover, the description format of the playback control command and the supplementary information is not limited to the example as shown in FIG. 4, and they may be described in other formats.

The control time determination means 106 determines the control start time at which each of the client terminals 20a, 20b starts the content control according to the playback control command received by the control request reception means 105 as the playback control request. Then, the control time determination means 106 adds information about the control start time to the playback control command, thus generating the playback control information. More specifically, the playback control information includes information about the playback control command and the control start time. The playback control command may be added with supplementary information. The determination method of the control start time will be explained later.

FIG. 5 is an explanatory diagram illustrating an example of playback control information generated by control time determination means 106. In the example as shown in FIG. 5, the description of the playback control command and the supplementary information is the same as the example as shown in FIG. 4. The playback control information as shown in FIG. 5 is different from the example as shown in FIG. 4 in that a control start time is added with the parameter name being "time". In example 1 as shown in FIG. 5, "1308637152032" is designated as the control start time. Example 1 means the control (pause in example 1) is started at the time when 1308637152032 milliseconds has elapsed since 0:0:0 on Jan. 1, 1970 of Greenwich mean time. Likewise, example 2 as illustrated in 5 means that the cue playback is started from the position 2300 milliseconds after the start of the content at the time "1308637165983". Likewise, example 3 as illustrated in 5 means that the fast-forward is started with quad-speed at the time "1308637178111".

When the control request reception means 105 receives playback control request (i.e., playback control command), the control information management means 107 stores the playback control command. When the control time determination means 106 generates playback control information obtained by adding the control start time to the playback control command, the control information management means 107 stores the playback control information including the playback control command and the control start time. The control information management means 107 associates and stores the identifier of the client terminal, of which playback control command and playback control information have not yet been transmitted as the playback control information, with the playback control command and the playback control information. FIG. 6 is an explanatory diagram illustrating an example of information stored by control information management means 107. The example as illustrated in FIG. 6 shows an example where a playback control command having no control start time attached thereto is stored. The control start time is added to the playback control command to be made into the playback control information, which is then transmitted to the client terminals 20a, 20b, but at this moment, it is not transmitted as the playback control information to the client terminals 20a, 20b. Therefore, the playback control information as well as the identifiers of the client terminals "20a", "20b" are stored to the control information management means 107.

The time synchronization means 108 synchronizes the time of the clock of the server 10 with a predetermined time, thus synchronizing the time of the clock of the server 10 with the correct time. For example, the time synchronization means 108 may refer to an NTP server (network time protocol server, not shown), and may synchronize the time of the clock of the server 10 with the time provided by the NTP server according to a network time protocol.

The time synchronization means 206 of the client terminal (see FIG. 7) also synchronizes the time of the clock of the client terminal with a predetermined time, thus synchronizing the time of the clock of the client terminal with the correct time. Therefore, the times of the clocks of the server 10 and each client terminal are synchronized, and indicate the same time. Then, all the client terminals 20a, 20b start content control (for example, playback, pause) according to the playback control command at the time determined by the control time determination means 106, and therefore, all the client terminals 20a, 20b can start the content control according to the playback control command at the same time.

The data memory means 109 stores data of the content reproduced by each of the client terminals 20a, 20b. The data memory means 109 stores data, for example, motion picture, and sound.

The data transmission means 110 transmits data of the content to each of the client terminals 20a, 20b.

The inquiry reception means 101, the waiting time determination means 102, the inquiry response transmission means 103, the communication delay management means 104, the control request reception means 105, the control time determination means 106, control information management means 107, the time synchronization means 108, and the data transmission means 110 are, for example, achieved with a CPU of a computer operating according to the content-synchronization control program. In this case, for example, the program memory means (not shown) of the computer stores a content-synchronization control program, and the CPU reads the program, and in accordance with the program, the CPU may operate as each of the elements 101, 102, 103, 104, 105, 106, 107, 108, 110. Alternatively, each of the elements may be realized as a separate unit.

Figure 7:
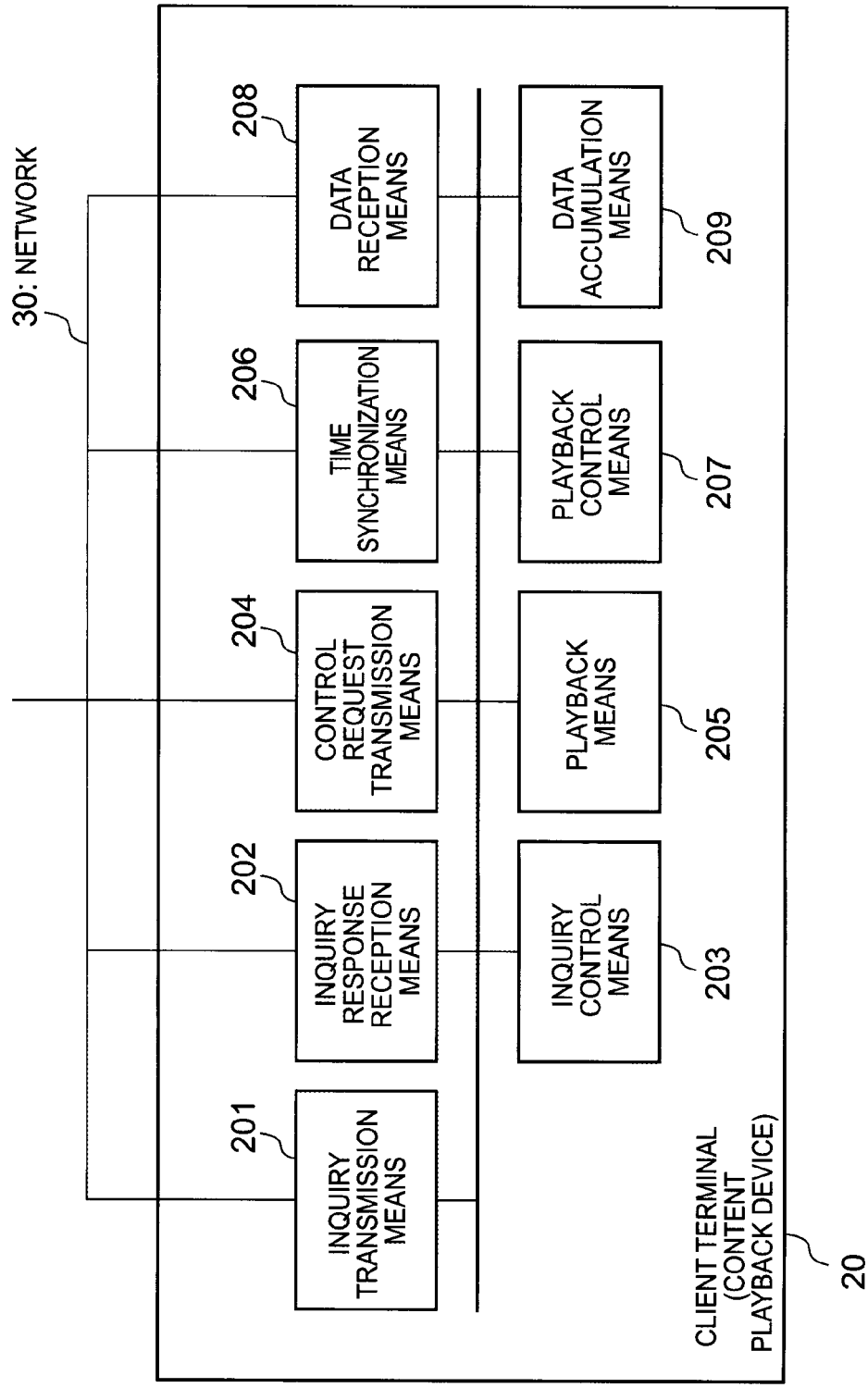
FIG. 7 It depicts a block diagram illustrating an example of configuration of a content playback device according to the first exemplary embodiment.

FIG. 7 is a block diagram illustrating an example of configuration of a client terminal (content playback device) 20 according to the first exemplary embodiment. In FIG. 7, the client terminal is represented with reference numeral "20". Each of the client terminals 20a, 20b as shown in FIG. 1 is the same as the client terminal 20 as shown in FIG. 7.

The client terminal 20 includes inquiry transmission means 201, inquiry response reception means 202, inquiry control means 203, control request transmission means 204, playback means 205, time synchronization means 206, playback control means 207, data reception means 208, and data accumulation means 209. The client terminal 20 is connected to the server 10 (not shown in FIG. 7) via the network 30.

The inquiry transmission means 201 transmits inquiry for determining presence/absence of playback control command that has not yet transmitted to the terminal in question (client terminal 20) to the server 10 in accordance with the inquiry control means 203.

The inquiry response reception means 202 receives a response in reply to the inquiry transmitted by the inquiry transmission means 201 to the server 10 (inquiry response) from the server 10. As explained above, this inquiry response includes information about the waiting time determined by the waiting time determination means 102. When the server 10 has a playback control command that has not yet been transmitted to the client terminal 20, the playback control information including the playback control command and the control start time is also included in the inquiry response.

When the waiting time passes since the time when the inquiry response reception means 202 receives the inquiry response, the inquiry transmission means 201 again transmits the inquiry for determining presence/absence of playback control command that has not yet transmitted to the terminal in question (client terminal 20). Therefore, the inquiry transmission means 201 repeatedly transmits the inquiry to the server 10. The inquiry transmission means 201 incorporates, into the inquiry to the server 10, the elapsed time (i.e., the above waiting time) from the reception time of the inquiry response to the transmission time of new inquiry.

The inquiry control means 203 controls the timing with which the inquiry transmission means 201 transmits inquiry to the server 10. More specifically, when the inquiry response reception means 202 receives the inquiry response, the inquiry control means 203 calculates the time at which subsequent inquiry is transmitted by adding the waiting time indicated by the inquiry response to the value of the reception time. Then, the inquiry control means 203 causes the inquiry transmission means 201 to transmit the inquiry to the server 10 at the time.

The control request means 204 transmits the playback control command corresponding to the user's operation of the client terminal 20 to the server 10 as the playback control request. For example, when the user of the client terminal 20 performs operation for commanding the playback start, the control request means 204 transmits the playback control command for commanding the playback start as the playback control request. Likewise, the control request means 204 transmits various kinds of playback control commands such as pause, fast-forward, fast-reverse, cue playback as the playback control request to the server 10 in response to the user's operation.

The playback means 205 executes playback, pause, fast-forward, fast-reverse, cue playback, and the like of the content on the basis of the command of the playback control means 207. The playback means 205 may perform playback and the like of contents with a generally-available web browser, for example.

The time synchronization means 206 synchronizes the time of the clock of the client terminal 20 with a predetermined time, thus synchronizing the time of the clock of the client terminal 20 with the correct time. This operation is the same as the time synchronization means 108 of the server.

The playback control means 207 controls the playback state of the content with the playback means 205 on the basis of the playback control information received by the inquiry response reception means 202.

The data reception means 208 receives the content played with the playback means 205 from the server 10.

The data accumulation means 209 accumulates the contents received with the data reception means 208, and gives the contents to the playback means 205.

The inquiry transmission means 201, the inquiry response reception means 202, the inquiry control means 203, the control request transmission means 204, the playback means 205, the time synchronization means 206, the playback control means 207, the data reception means 208, and the data accumulation means 209 are, for example, achieved with a CPU of a computer operating according to the content playback program. In this case, for example, program memory means of a computer (not shown) stores the content playback program, and the CPU reads the program, and in accordance with the program, the CPU may operate as each of the elements 201 to 209. Alternatively, each of the elements may be realized as a separate unit.

The present exemplary embodiment shows an example where the content reproduced by each client terminal is stored to the data memory means 109 of the server 10 (see FIG. 2), and the data reception means 208 of each client terminal receives the content from the server 10. The content is stored to a device different from the server 10, and the data reception means 208 of each client terminal may receive the content from the device. It may be configured such that any one of the client terminals stores the content, and the content is transmitted and received by the client terminal and each of the other client terminals.

Subsequently, operation will be explained. In the explanation below, suppose that the time synchronization means 108 of the server 10 and the time synchronization means 206 of each of the client terminals 20a, 20b synchronize the time of the clock of each of the devices with a predetermined time (for example, the time of the NTP server). More specifically, suppose that the times of the clocks of all of the server 10 and each of the client terminals 20a, 20b are already synchronized with the correct time. In each of the client terminals 20a, 20b, suppose that the data reception means 208 receives the content from the data transmission means 101 of the server 10, and the data accumulation means 209 has already accumulated the content.

In the explanation below, an operation in which the server 10 transmits an inquiry response not including the playback control information in reply to the inquiry from the client terminal, and an operation in which the server 10 transmits an inquiry response including the playback control information in reply to the inquiry from the client terminal will be explained.

Figure 8:
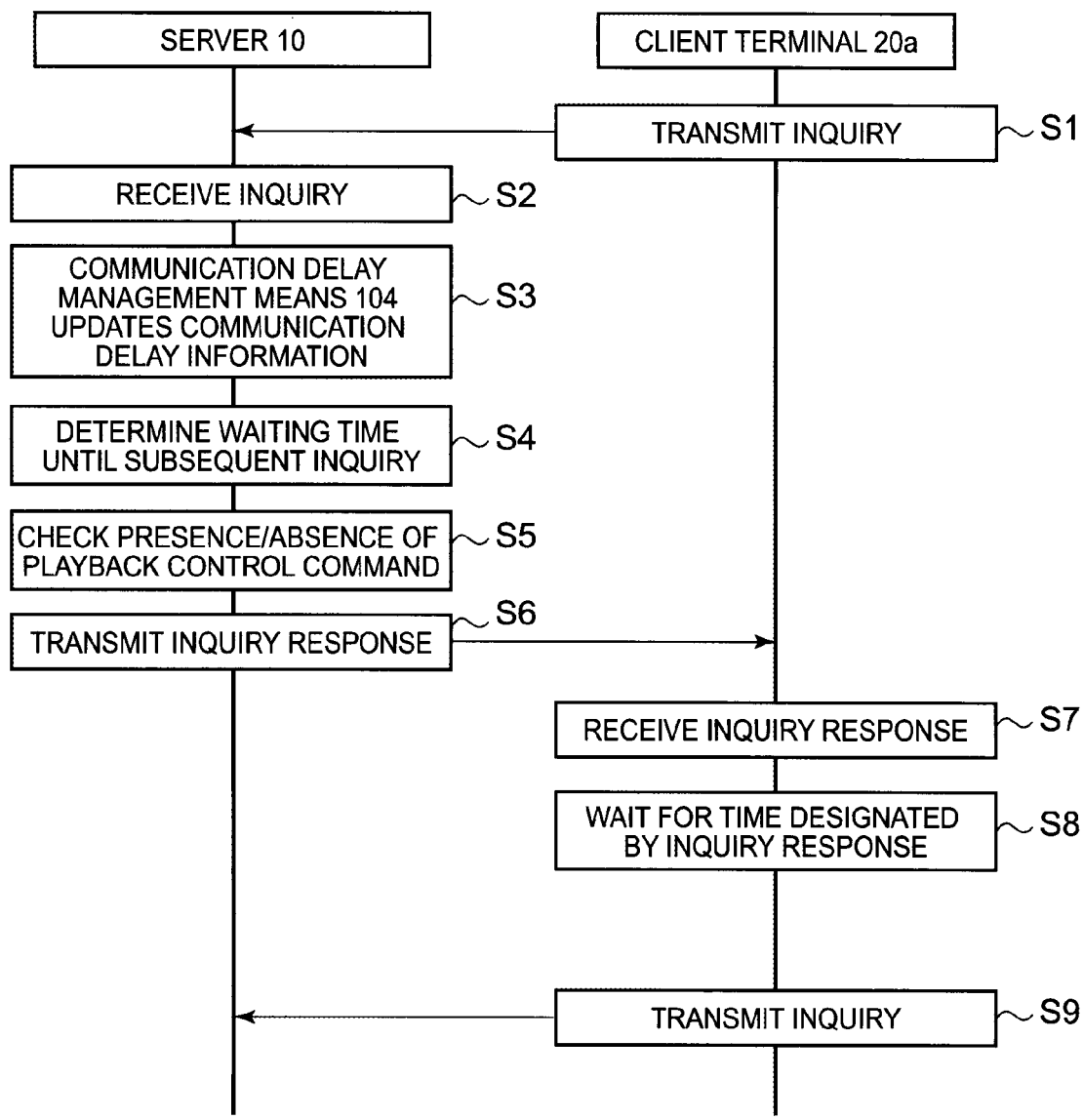
FIG. 8 It depicts a sequence diagram illustrating an example of operation in a case where a server 10 transmits an inquiry response not including playback control information.

FIG. 8 is a sequence diagram illustrating an example of operation in a case where the server 10 transmits an inquiry response not including playback control information in reply to the inquiry from the client terminal. When user's operation is not performed in any one of the client terminals 20a, 20b, processing is performed as shown in FIG. 8.

FIG. 8 shows an example where the client terminal 20a transmits an inquiry to the server 10. In FIG. 8, operation of the client terminal 20b is not shown, but the same processing as the processing between the server 10 and the client terminal 20a is executed in parallel also by the server 10 and the client terminal 20b.

The inquiry transmission means 201 of the client terminal 20a transmits, to the server 10, an inquiry for determining presence/absence of playback control command not transmitted to the client terminal 20a (step S1). More specifically, the inquiry control means 203 calculates the time obtained by adding the waiting time indicated by the previous inquiry response to the previous inquiry response reception time, and at that time, the inquiry control means 203 causes the inquiry transmission means 201 to transmit the inquiry to the server 10. At this occasion, the inquiry transmission means 201 adds, to the inquiry transmitted to the server 10, the elapsed time (i.e., waiting time) from the previous inquiry response reception time to the transmission time of the inquiry in step S1.

The inquiry reception means 102 of the server 10 receives the inquiry transmitted by the client terminal 20a (step S2).

Subsequently, the communication delay management means 104 of the server 10 refers to the previous inquiry response transmission time for the client terminal 20a in the communication delay information held therein. Then, the communication delay management means 104 calculates the communication delay between the server 10 and the client terminal 20a on the basis of the inquiry response transmission time, the time when the inquiry is received in step S2, and the elapsed time added to the inquiry. Further, the communication delay management means 104 updates the value of the communication delay corresponding to the client terminal 20a in the communication delay information thus held with the value of the communication delay newly calculated (step S3).

Subsequently, the waiting time determination means 102 of the server 10 determines the waiting time from when the client terminal 20a receives the inquiry response from the server 10 to when a subsequent inquiry is transmitted (step S4). The waiting time determination means 102 may determine, for example, the waiting time according to the method shown below. The waiting time determination means 102 stores the reception cycle of the inquiry from the same client terminal. The reception cycle of the inquiry is represented by reference numeral T. For example, the reception cycle T of the inquiry is determined in advance by the administrator of the server 10, and may be stored to the waiting time determination means 102. The reception cycle T of the inquiry is the same in each of the client terminals 20a, 20b, and the administrator may determine a value as the value of T. It should be noted that, because of variation of the communication delay, the actual reception cycle of the inquiry may vary. However, T which is determined in advance can be said to be the reference value of the reception cycle of the inquiry.

The waiting time determination means 102 obtains the current time. Then, the waiting time determination means 102 derives the integer n with which T×n is most close to the current time. In the present invention, the time indicated by T×n is a time close to the current time. In the ideal case, T×n is the same as the current time, but the communication delay of the same client terminal and the server 10 may vary, and therefore, the time indicated by T×n can be before or after the current time. It should be noted that the waiting time determination means 102 may use, as the current time, the inquiry reception time in step S2, for example. Alternatively, the time when step S3 is terminated and step S4 is started may be used as the current time. In the processing of the computer, the reception time in step S2 is hardly different from the start time in step S4, and the waiting time determination means 102 may adopt, as the current time, a time close to the time when step S4 is executed. The waiting time determination means 102 reads the value of the communication delay of the client terminal 20a of the source of transmission of the inquiry from the communication delay management means 104, and determines the waiting time of the client terminal 20a by performing calculation of the following expression (2).

waiting time=$T \times (n+1)$−current time−value of communication delay  expression (2)

The waiting time is determined as described above, so that the time when a subsequent inquiry is received from the client terminal 20a is substantially T×(n+1). In this case, the reason why it is "substantially T×(n+1)" is that this is determined in view of variation of the communication delay.

After step S4, the control information management means 107 of the server 10 checks whether the playback control command transmitted to the client terminal 20a of the source of transmission of the inquiry is stored or not (step S5). In the example as illustrated in FIG. 8, it is considered that a playback control command which is to be transmitted to the source of transmission of inquiry does not exist (i.e., the control information management means 107 does not store it). The processing in such case where there is playback control command will be explained later with reference to FIGS. 9 and 10.

When a playback control command which is to be transmitted to the source of transmission of inquiry does not exist, the inquiry response transmission means 103 of the server 10 transmits an inquiry response describing the waiting time determined in step S4 to the client terminal 20a of the source of transmission of the inquiry (step S6). At this occasion, a playback control command for the client terminal 20a does not exist, and therefore, the playback control information is not added to the inquiry response. At this occasion, the communication delay management means 104 updates "previous inquiry response transmission time" corresponding to the client terminal 20a at the inquiry response transmission time.

In the client terminal 20a which is the source of transmission of inquiry, the inquiry response reception means 202 receives the inquiry response transmitted by the server 10 in step S6 (step S7).

Subsequently, the inquiry control means 203 of the client terminal 20a reads the waiting time described in the inquiry response, and causes the inquiry transmission means 201 to wait without transmitting the inquiry until the waiting time elapses. The inquiry transmission means 201 waits until the waiting time passes in accordance with the inquiry control means 203 (step S8). More specifically, the inquiry control means 203 calculates the time obtained by adding the waiting time to the reception time of the inquiry response in step S7, and causes the inquiry transmission means 201 to wait until the time comes.

Then, when it is the time obtained by adding the waiting time to the reception time of the inquiry response, the inquiry control means 203 causes the inquiry transmission means 201 to transmit the inquiry to the server 10. The inquiry transmission means 201 transmits again the inquiry to the server 10 in accordance with the inquiry control means 203 (step S9). At this occasion, the inquiry transmission means 201 adds the elapsed time from the previous inquiry response reception time to the transmission time of the inquiry in step S9 to the inquiry and transmits the inquiry.

As a result, the time when the server 10 receives the inquiry transmitted in step S9 is substantially T×(n+1).

Step S9 is the same processing as step S1, and the processing in step S9 and subsequent steps are the same as the processing in step S1 and subsequent steps.

As explained above, the same processing as the processing between the server 10 and the client terminal 20a is executed in parallel also by the server 10 and the client terminal 20b. Therefore, like the example explained above, the inquiry which the client terminal 20b transmitted in step S9 is also received by the server at substantially time T×(n+1).

As explained above, the inquiry transmitted by each of the client terminals 20a, 20b is adjusted to reach the server 10 at substantially the same time.

Figure 9:
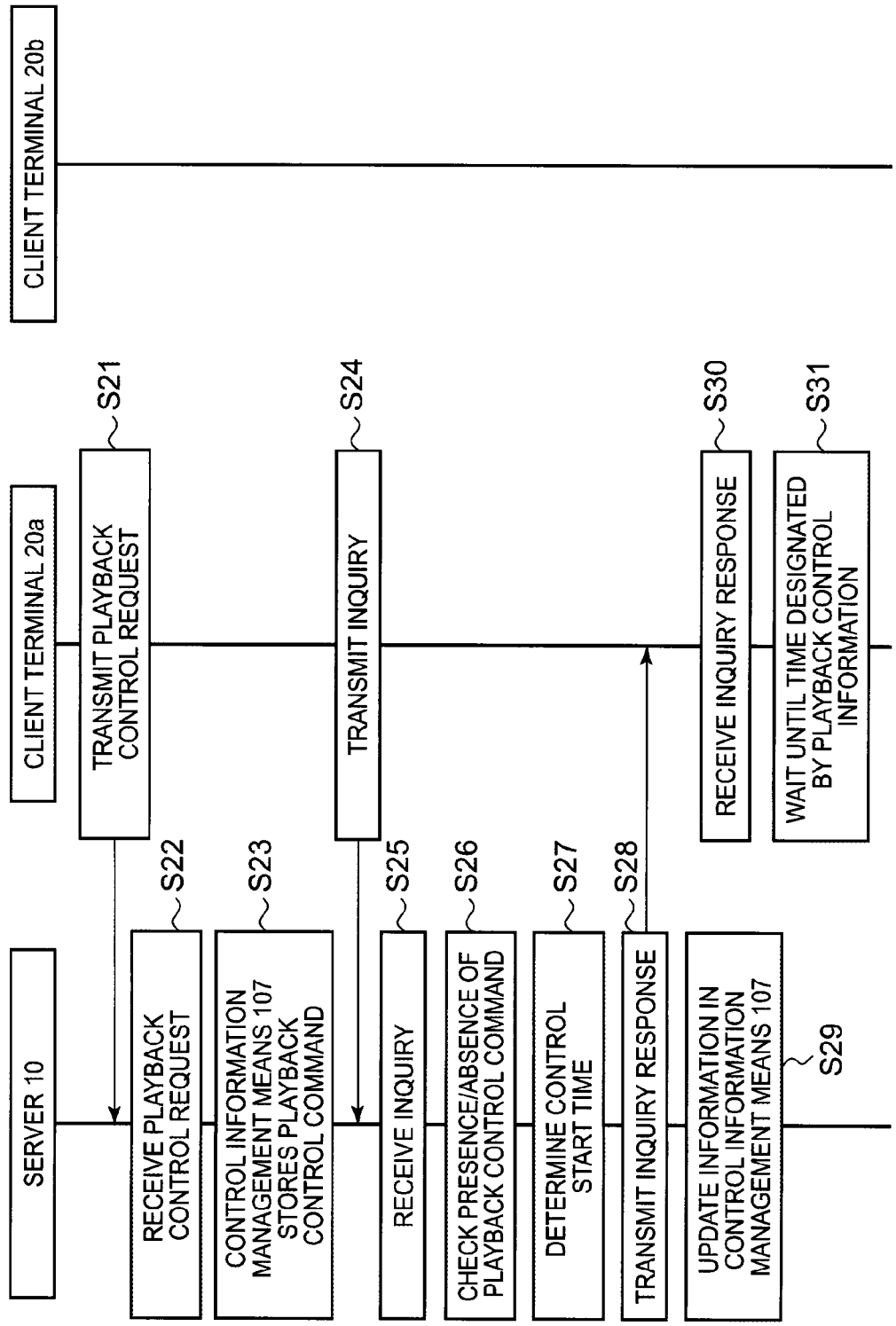
FIG. 9 It depicts a sequence diagram illustrating an example of operation in a case where a server 10 transmits an inquiry response including playback control information.
Figure 10:
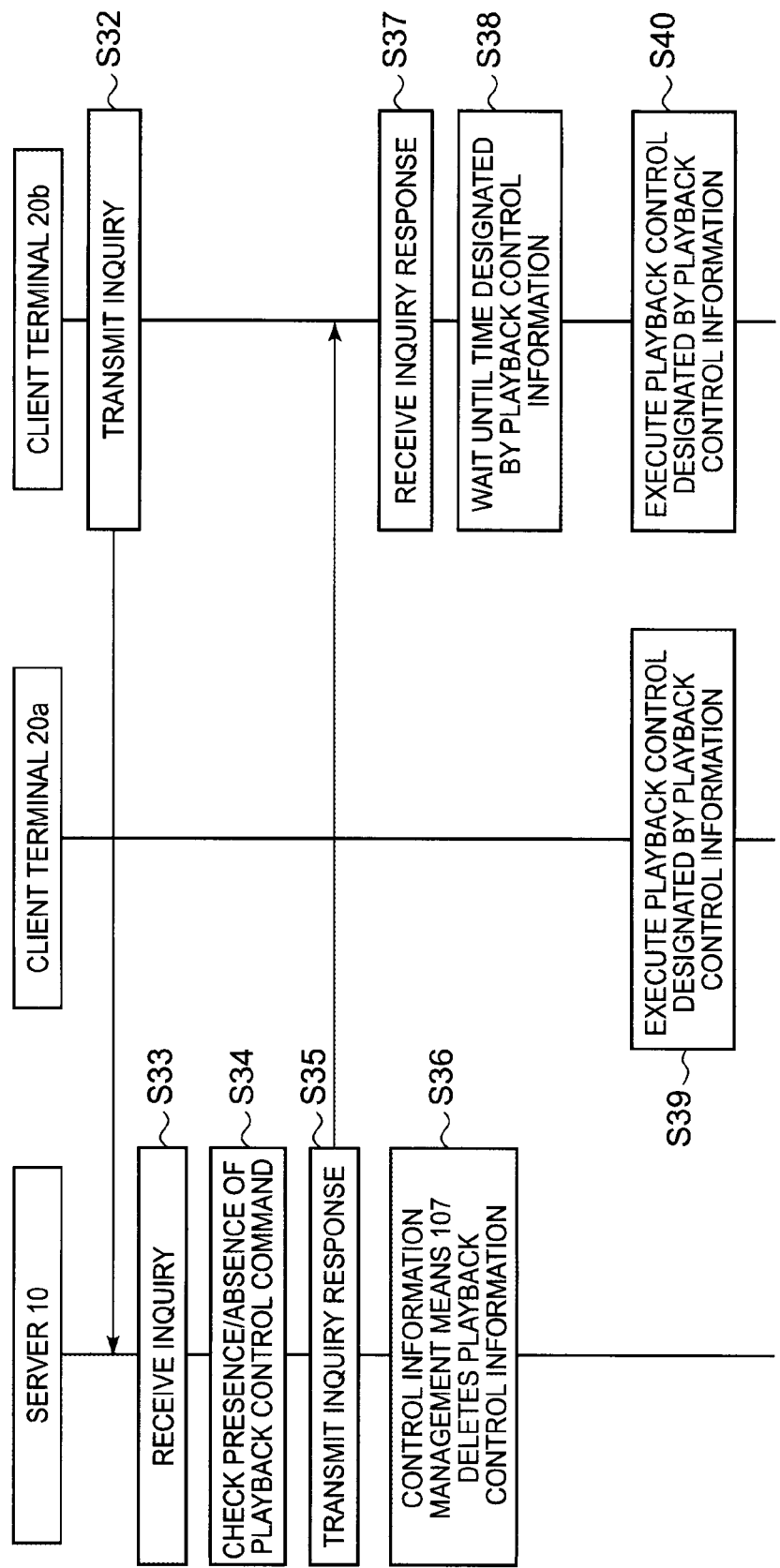
FIG. 10 It depicts a sequence diagram illustrating an example of operation in a case where a server 10 transmits an inquiry response including playback control information.

FIGS. 9 and 10 are sequence diagrams illustrating an example of operation in a case where the server 10 transmits an inquiry response including playback control information in reply to the inquiry from the client terminal. In FIG. 9, a case where the user of the client terminal 20a performs operation of playback start and pause of the content will be explained for example.

First, the user of the client terminal 20a performs operation of playback control of the content. In this example, suppose that the user performs pause operation during playback of a motion picture. When the user performs playback control with the client terminal 20a, the control request transmission means 204 of the client terminal 20a transmits playback control request to the server 10 (step S21). In this case, for example, a playback control command as shown in example 1 of FIG. 4 (command for commanding start of pause) is transmitted as a playback control request.

The control request reception means 105 of the server 10 receives playback control request transmitted in step S21 (step S22). Then, the control information management means 107 of the server 10 stores the playback control command (In this example, command shown in example 1 of FIG. 4) received as the playback control request (step S23). At this occasion, the control information management means 107 stores the playback control command as well as each the identifier of the client terminal which is the target for synchronizing the content control. In this example, the playback control command as well as the identifiers ("20a", "20b") of the client terminals 20a, 20b are stored. More specifically, the control information management means 107 stores information as shown in FIG. 6, for example. The information stored by the control information management means 107 (see FIG. 6) indicates that the playback control command (command=pause) has not yet been transmitted as the playback control information to the client terminals 20a, 20b.

It should be noted that the identifier of the client terminal which is the target for synchronizing the content control may be held in the control information management means 107 in advance.

In the explanation about this case, the user of the client terminal 20a performs operation, and the client terminal 20a transmits the playback control request, for example. Operation of the server 10 in a case where the user of the client terminal 20b performs operation and the client terminal 20b transmits the playback control request is also the same as steps S22, S23 explained above.

Subsequently, the inquiry transmission means 201 of the client terminal 20a transmits, to the server 10, an inquiry for determining presence/absence of playback control command not transmitted to the client terminal 20a (step S24). Then, the inquiry reception means 102 of the server 10 receives the inquiry (step S25). The operation in steps S24, S25 is the same as the operation in steps S1, S2 (see FIG. 8). Although not shown in FIG. 9, after step S25, the communication delay management means 104 updates the communication delay information, and the waiting time determination means 102 determines the waiting time. This operation is the same as the operation in steps S3, S4 explained above.

Thereafter, the control information management means 107 of the server 10 checks whether the playback control command transmitted to the client terminal 20a of the source of transmission of the inquiry is stored or not (step S26). In this example, the control information management means 107 holds the information as shown in FIG. 6 for example. Therefore, the control information management means 107 determines that there is a playback control command (command=pause) which is to be transmitted to the client terminal 20a.

When there is a playback control command (command=pause) which is to be transmitted to the client terminal 20a, the control time determination means 106 determines the control start time concerning the playback control command under the condition that the control start time concerning the playback control command has not yet been determined (step S27). When the control start time has already been determined, the processing in step S27 may not be executed.

The control time determination means 106 may determine the control start time according to the method shown below for example. The control time determination means 106 obtains the current time. The control time determination means 106 refers to the communication delay information stored in the delay information management means 104 (information shown in FIG. 3, for example), and reads the communication delay of each of the client terminals 20a, 20b which is the target for synchronizing the content control. Hereinafter, the maximum value of the communication delay of each of the client terminals 20a, 20b is represented as Rmax. The playback control processing time in each client terminal is α. The playback control processing time α is a margin time required before the playback control means 207 starts the content control according to the playback control command. The control time determination means 106 performs calculation of expression (3) below, thus determining the control start time.

control start time=current time+($R$max/2)+α      expression (3)

In expression (3), the reason why Rmax/2 is used will be explained. As explained above, the communication delay is a time required by two-way communication between the client terminal and the server 10. On the other hand, what is needed in driving the control start time is the time required in transmission of the playback control information from the server 10 to the client terminal and execution of processing such as playback, pause by the client terminal according to the playback control information. Rmax/2 corresponds to the maximum value of one-way communication time from the server 10 to each client terminal. Therefore, in expression (3), instead of adding the maximum value Rmax of the communication delay, Rmax/2 is added.

The playback control processing time α may be determined by the administrator of the server 10 to be stored to the control time determination means 106. It should be noted that when the playback control processing time of each of the client terminals 20a, 20b is the same, the same value may be defined as α. When the playback control processing time of each of the client terminals 20a, 20b varies, the maximum value thereof may be defined as α.

The control time determination means 106 may use, as the current time, a time close to execution of step S27. For example, the time when step S26 is finished and step S27 is started may be used as the current time.

A calculation example of expression (3) will be shown. For example, suppose that the current time is "1308637151832". As illustrated in FIG. 3, the communication delay of the client terminal 20a is 10 milliseconds, and the communication delay of the client terminal 20b is 200 milliseconds. At this occasion, Rmax is 200. Suppose that the playback control processing time α is defined as 100 milliseconds. In this case, according to the following calculation, the control time determination means 106 may calculate the control start time "1308637152032".

1308637151832+200/2+100=1308637152032

Rmax/2 in expression (3) represents the maximum value of one-way communication time between the server 10 and the client terminal. The value representing the maximum value of one-way communication time between the server 10 and the client terminal may be a value other than the value of Rmax/2. Depending on the communication method, the maximum value of one-way communication time between the server 10 and the client terminal may be represented as Rmax/k using a value k which is not two. The value k is a value according to the communication method. Therefore, depending on the communication method, using the value k according to the communication method, Rmax/2 in the expression (3) may be replaced with Rmax/k.

The control time determination means 106 calculates the control start time, and thereafter, generates playback control information by combining with the playback control command determined to exist in step S26.

Subsequently, the inquiry response transmission means 103 incorporates the playback control information generated by the control time determination means 106 into the inquiry response describing the waiting time, and transmits the inquiry response to the client terminal 20a of the source of transmission of the inquiry (step S28). At this occasion, the communication delay management means 104 updates "previous inquiry response transmission time" corresponding to the client terminal 20a at the inquiry response transmission time.

Figures 11, 12:
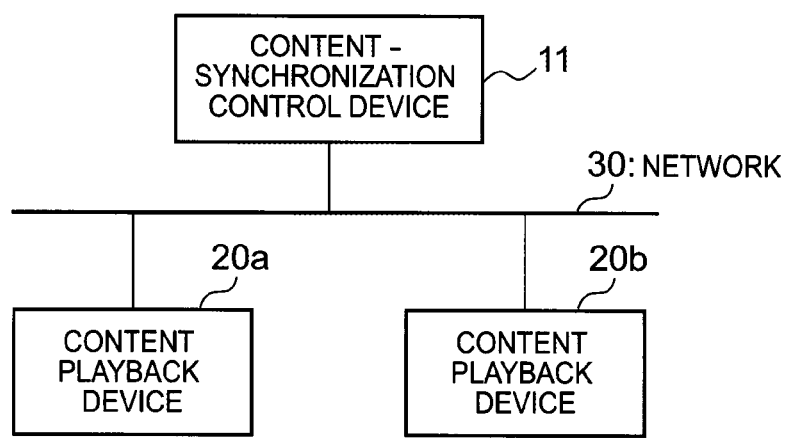
FIG. 11 It depicts an explanatory diagram illustrating an example of information after update in step S29.
FIG. 12 It depicts a block diagram illustrating an example of a content synchronization system of a second exemplary embodiment of the present invention.

Subsequently, the control information management means 107 updates the stored information (step S29). More specifically, the playback control command determined to exist in step S26 is updated with the content of the playback control information generated by the control time determination means 106. As a result, the control information management means 107 changes from the state of storing the playback control command without storing the control start time to the state of storing the control start time and the playback control command. In the identifier of the client terminal corresponding to the playback control command, the identifier of the client terminal which is the destination of transmission of the playback control information (inquiry response) is deleted. FIG. 11 illustrates an example of information after update in step S29. When compared with the information before the update in FIG. 6, the identifier "20a" of the client terminal 20a which is the destination of transmission of the playback control information is deleted. The control start time is added, and the playback control command is stored as the playback control information.

The inquiry response reception means 103 of the client terminal 20a receives the inquiry response transmitted in step S28 (step S30). Then, the playback control means 207 of the client terminal 20a waits without performing the content playback control in accordance with the control start time indicated by the playback control information included in the inquiry response (step S31). Subsequent operation will be explained with reference to FIG. 10.

The inquiry transmission means 201 of the client terminal 20b transmits, to the server 10, an inquiry for determining presence/absence of playback control command not transmitted to the client terminal 20b (step S32). Then, the inquiry reception means 102 of the server 10 receives the inquiry (step S33). It should be noted that the time when the inquiry from each of the client terminals 20a, 20b is received by the server 10 is adjusted to be substantially the same time, but the example as illustrated in FIGS. 9 and 10 shows a case where the inquiry from the client terminal 20a is received first.

The operation in steps S32, S33 is the same as the operation in steps S24, S25 (see FIG. 9) and the operation in steps S1, S2 (see FIG. 8). Although not shown in FIG. 10, after step S33, the communication delay management means 104 updates the communication delay information, and the waiting time determination means 102 determines the waiting time. This operation is the same as the operation in steps S3, S4 explained above.

Thereafter, the control information management means 107 of the server 10 checks whether the playback control command transmitted to the client terminal 20b of the source of transmission of the inquiry is stored or not (step S34). In this example, the control information management means 107 holds the information as shown in FIG. 11 for example. Therefore, the control information management means 107 determines that there is a playback control command (command=pause) which is to be transmitted to the client terminal 20b. In the example as illustrated in FIG. 11, the playback control command as well as the control start time are stored as the playback control information.

Step S34 is the same processing as step S26, but in step S34, the control start time corresponding to the playback control command is already determined. Therefore, after step S34, the control time determination means 106 may not determine the control start time. Therefore, after step S34, the inquiry response transmission means 103 transmits the inquiry response including the playback control information as shown in FIG. 11 for example to the client terminal 20b of the source of transmission of the inquiry (step S35). The inquiry response transmission means 103 incorporates, into the inquiry response, the information about the waiting time. At this occasion, the communication delay management means 104 updates "previous inquiry response transmission time" corresponding to the client terminal 20b at the inquiry response transmission time.

Subsequently, the control information management means 107 updates the stored information (step S36). In this case, the control information management means 107 deletes the identifier of the client terminal which is the destination of transmission of the playback control information (inquiry response) in the identifier of the client terminal corresponding to the playback control information included in the inquiry response in step S35. Then, when all the identifiers of the client terminals corresponding to the playback control information are deleted, the playback control information is also deleted. In this example, in step S35, the playback control information is transmitted to the client terminal 20b, and therefore, the identifier "20b" is deleted. Then, all the identifiers of the client terminals corresponding to the playback control information as shown in FIG. 11 are deleted, and therefore, the control information management means 107 also deletes the playback control information.

The inquiry response reception means 103 of the client terminal 20b receives the inquiry response transmitted in step S35 (step S37). Then, the playback control means 207 of the client terminal 20b waits without performing the content playback control in accordance with the control start time indicated by the playback control information included in the inquiry response (step S38).

The control start times included in the playback control information received by the client terminals 20a, 20b are the same time. The playback control means 207 of each of the client terminals 20a, 20b executes, at the control start time, the content control indicated by the playback control command in the playback control information (steps S39, S40). The playback means 205 of each of the client terminals 20a, 20b performs operation according to the control of the playback control means 207. In this example, processing for pausing the motion picture which is being played is performed. As a result, the motion picture played by the client terminals 20a, 20b is paused in a synchronized manner. In this case, pause is explained as an example, but the processing is the same also in the case of playback start, fast-forward, fast-reverse, cue playback, and the like.

In the example as illustrated in FIGS. 9 and 10, the client terminal 20a transmits the inquiry first. Alternatively, the client terminal 20b may transmit the inquiry first.

In FIGS. 9 and 10, operation for transmitting a subsequent inquiry after the client terminals 20a, 20b receive the inquiry response is omitted from the drawings, but the operation for transmitting a subsequent inquiry after the client terminals 20a, 20b receive the inquiry response is the same as what has been shown in FIG. 8.

According to the present exemplary embodiment, the server 10 makes adjustment so that the inquiries from the multiple client terminals 20a, 20b which are the targets for synchronizing the content control are received substantially at the same time. Then, when the server 10 receives an inquiry from any given client terminal of the client terminals 20a, 20b, the server 10 determines the time (control start time) for executing the content control at the same time in all the client terminals. Further, the server 10 transmits the inquiry response including the control start time as the response corresponding to the inquiry from each of the client terminals 20a, 20b received substantially at the same time. Therefore, in the environment where the server 10 performs communication in accordance with HTTP, the content control of each of the client terminals 20a, 20b can be synchronized.

Further, when the control start time is determined, the server 10 may not add the inquiry reception cycle T (see expression (3)). Therefore, the control start time can be determined as an earlier time.

In the mode for transmitting commands concerning video data in a peer-to-peer manner between user computers in the techniques described in PLT 3, it is difficult to directly transmit a command to a user computer under NAT (network address translation) or in the firewall. However, this problem can be solved by installing dedicated application software supporting TCP (transmission control protocol) to the user computer. However, the dedicated application software is required. In contrast, in the present invention, communication is performed in accordance with HTTP, and therefore, the client terminal under NAT and the like can be controlled by the server 10. Moreover, it is not necessary to use dedicated application software supporting TCP, and contents can be played using a generally-available browser.

Second Exemplary Embodiment

FIG. 12 is a block diagram illustrating an example of a content synchronization system of a second exemplary embodiment of the present invention. A content synchronization system of the second exemplary embodiment includes a content-synchronization control device 11 and multiple content playback devices 20a, 20b. The content-synchronization control device 10 and each of the content playback devices 20a, 20b are connected via a network 30. The content playback devices 20a, 20b are the same as the content playback devices 20a, 20b of the first exemplary embodiment, and therefore detailed description thereabout is omitted. In the explanation below, like the first exemplary embodiment, the content-synchronization control device is referred to as a server, and the content playback device is referred to as a client terminal.

The server 11 performs not only the operation of the server in the first exemplary embodiment but also the processing for updating the reception cycle T of the inquiry from the client terminal. The update condition of the reception cycle T of the inquiry will be explained later.

Figure 13:
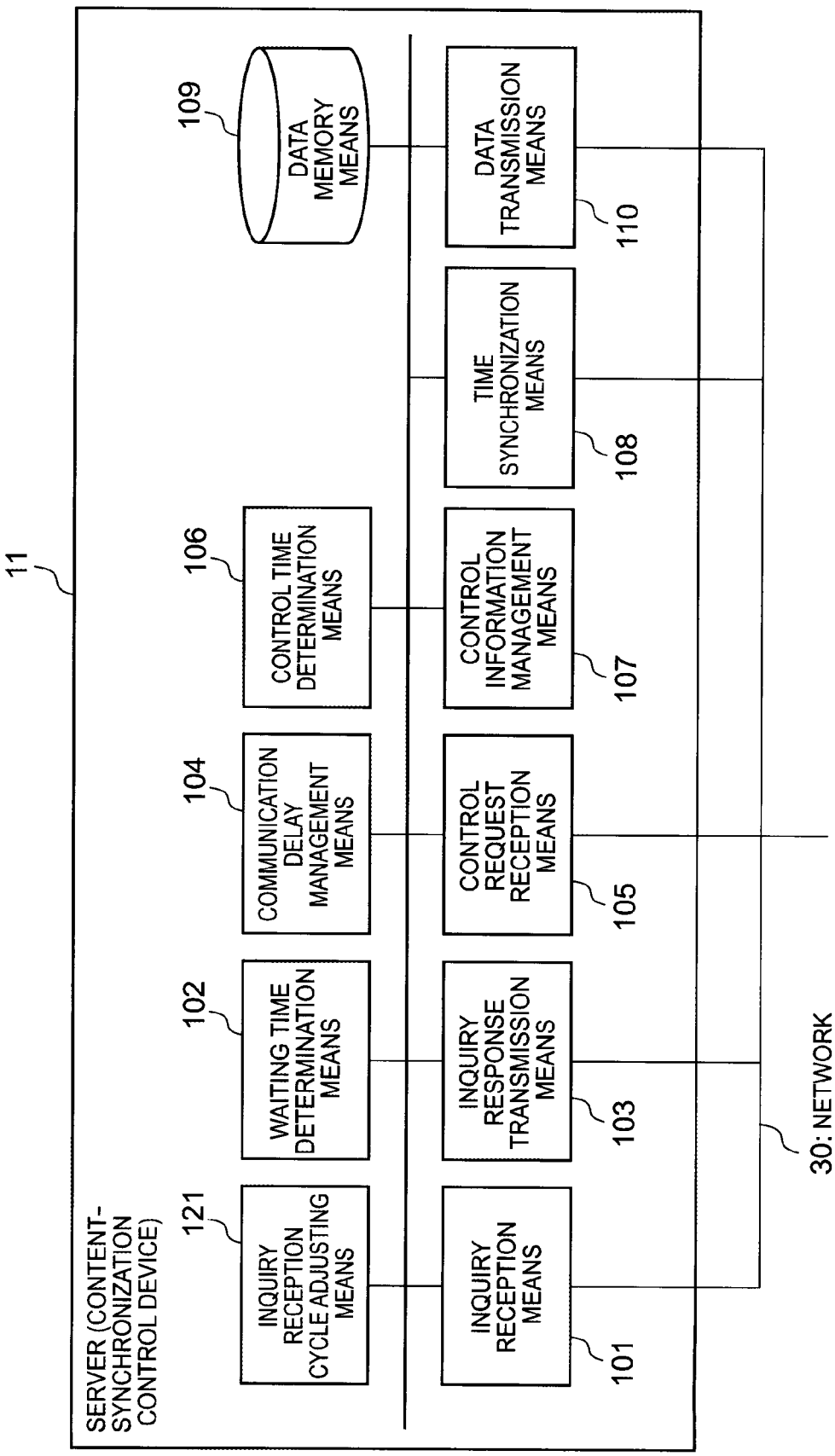
FIG. 13 It depicts a block diagram illustrating an example of configuration of a content-synchronization control device according to the second exemplary embodiment.

FIG. 13 is a block diagram illustrating an example of configuration of a server (content-synchronization control device) 11 according to the second exemplary embodiment. The same elements as the elements of the server 10 of the first exemplary embodiment are denoted with the same reference numerals as those of FIG. 2, and explanation thereabout is omitted. The server 11 includes not only the elements of the server 10 of the first exemplary embodiment but also inquiry reception cycle adjusting means 121.

When a predetermined condition is satisfied, the inquiry reception cycle adjusting means 121 adjusts the value T by updating the reception cycle T of the inquiry from the client terminal. For example, the initial value of the reception cycle T of the inquiry is determined in advance by the administrator of the server 11, and may be stored to the waiting time determination means 102. Then, the inquiry reception cycle adjusting means 121 updates T stored in the waiting time determination means 102.

After the update processing of the value of the communication delay, the inquiry reception cycle adjusting means 121 compares the updated communication delay (hereinafter referred to as da) and the reception cycle T of the inquiry. Then, inquiry reception cycle adjusting means 121 updates T with a value larger than da when the updated communication delay da is more than the inquiry reception cycle T. For example, the inquiry reception cycle adjusting means 121 calculates the value T updated by performing calculation T=da×1.1. However, this calculation is an example of calculation of a new value of T, and the calculation method of the updated value T is not limited to this calculation method as long as T is updated to satisfy the relationship of T>da.

The inquiry reception cycle adjusting means 121 is achieved with a CPU of a computer operating in accordance with, for example, a content-synchronization control program. Each of the elements and inquiry reception cycle adjusting means 121 may be realized as a separate unit.

Figure 14:
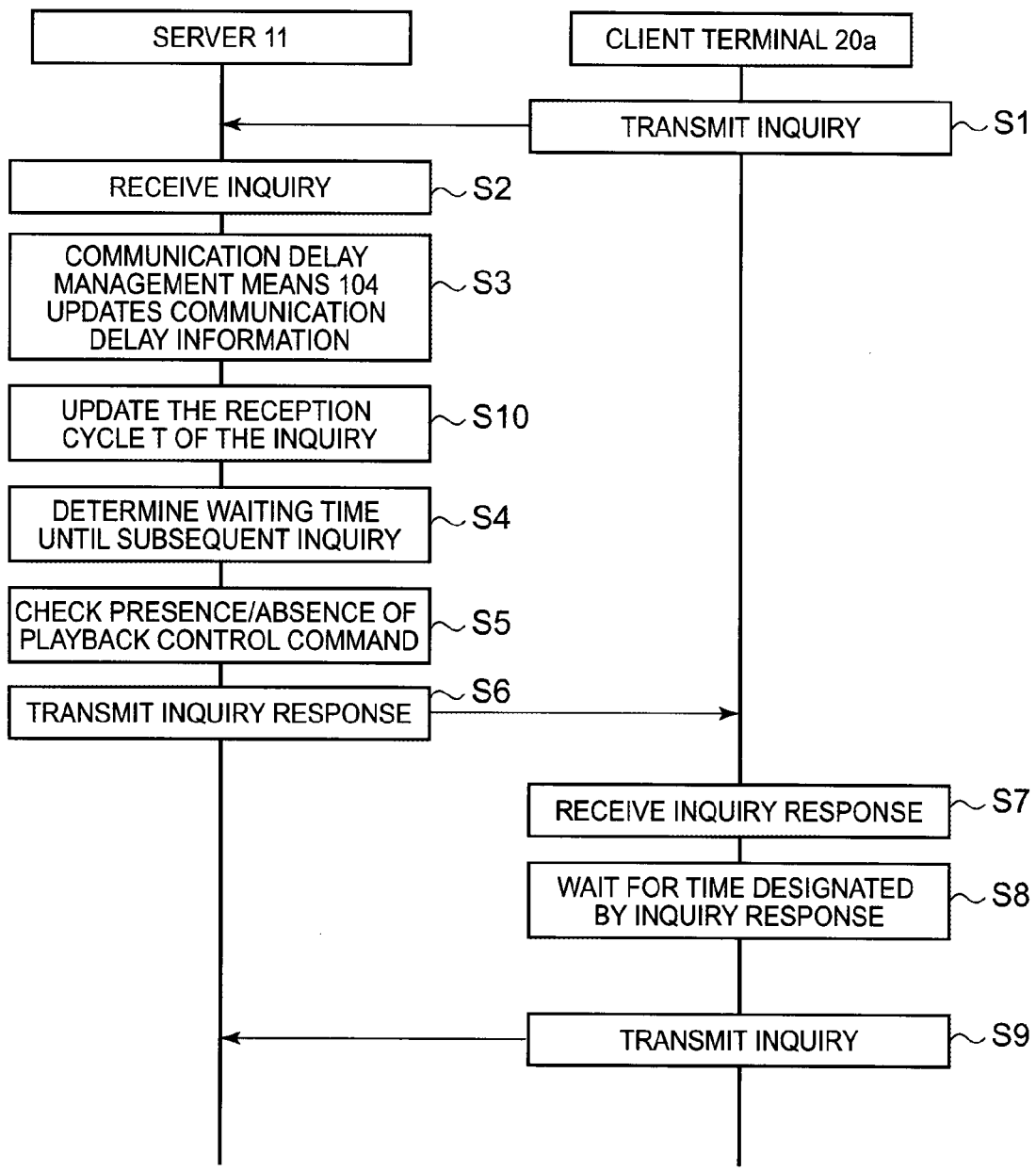
FIG. 14 It depicts a sequence diagram illustrating an example of operation of according to the second exemplary embodiment.

FIG. 14 is a sequence diagram illustrating an example of operation of according to the second exemplary embodiment. The same processing as the processing as shown in FIG. 8 is denoted with the same reference numerals as those in FIG. 8, and detailed description thereabout is omitted.

The inquiry transmission means 201 of the client terminal 20a transmits, to the server 11, an inquiry for determining presence/absence of playback control command not transmitted to the client terminal 20a (step S1). The inquiry reception means 102 of the server 11 receives the inquiry transmitted by the client terminal 20a (step S2). Subsequently, the communication delay management means 104 of the server 11 calculates the communication delay between the client terminal 20a and the server 11. Then, the communication delay management means 104 of the server 11 updates the value of the communication delay between the client terminal 20a and the server 11 in the communication delay information thus held (step S3). Operation in steps S1 to S3 is the same as the operation of the first exemplary embodiment.

In the second exemplary embodiment, after step S3, the inquiry reception cycle adjusting means 121 compares the reception cycle T of the inquiry and the communication delay da between the client terminal 20a and the server 11 calculated in step S3, and updates the value of T with a value larger than da under the condition that da>T is satisfied (step S10). When da is equal to or less than T in step S10, the inquiry reception cycle adjusting means 121 does not update T.

The inquiry reception cycle adjusting means 121 performs the processing in step S10 explained above, so that the reception cycle T of the inquiry is adjusted to a value larger than the maximum value of the communication delay derived until then.

Operation in step S10 and subsequent steps (operation in step S4 and subsequent steps) is the same as the operation of the first exemplary embodiment. In step S4, the waiting time determination means 102 uses the latest value of T to calculate the waiting time.

It should be noted that FIG. 13 shows an example where the client terminal 20a transmits an inquiry to the server 11, but the operation is also the same even in a case where the client terminal 20b transmits an inquiry to the server 11. No matter for which client terminal the server 11 calculates the waiting time, the server 11 uses the same T. More specifically, the server 11 does not distinguish the reception cycle T of the inquiry for each of the client terminals. Then, the waiting time determination means 102 calculates the waiting time using the value of T during execution of step S4, without depending on client terminal.

According to the above operation, the inquiry transmitted by each of the client terminals 20a, 20b is adjusted to reach the server 11 at substantially the same time.

In the second exemplary embodiment, the operation in a case where the server 11 transmits an inquiry response including playback control information in reply to the inquiry from the client terminal will be explained. In the first exemplary embodiment explained above, although not shown in FIG. 9, the same processing as steps S3, S4 is performed in steps S25, S26 in the explanation. Likewise, although not shown in FIG. 10, the same processing as steps S3, S4 is performed in steps S33, S34 in the explanation. In the second exemplary embodiment, in steps S25, S26, the server 11 performs the same operation as steps S3, S10, S4. In addition, in steps S33, S34, the server 11 performs the same operation as steps S3, S10, S4. The second exemplary embodiment is the same as the first exemplary embodiment with regard to other features.

The same effects as those of the first exemplary embodiment are also obtained in the second exemplary embodiment. Further, in the second exemplary embodiment, the inquiry reception cycle adjusting means 121 adjusts the reception cycle T of the inquiry to a value larger than the maximum value of the communication delay in the past. Therefore, even when the communication delay increases, the server 11 can receive the inquiry from each of the client terminals 20a, 20b with the same cycle at the same time. As a result, even when the communication delay increases, the same effects as those of the first exemplary embodiment can be obtained.

In the second exemplary embodiment explained above, the value of T is updated with a value larger than da under the condition that da>T is satisfied. In addition to this update processing, the inquiry reception cycle adjusting means 121 may update T with a smaller value when another condition, which is different from da>T, is satisfied. For example, when a condition that "the value of the communication delay da updated in step S3 is equal to or less than a predetermined value" is satisfied, the inquiry reception cycle adjusting means 121 may return the value of T back to the initial value in step S10. This predetermined value may be a value less than the initial value of T (for example, 0.8×T).

In the second exemplary embodiment, when the communication state is deteriorated and the value of the communication delay da increases, the value of T increases. As a result, even when the communication state is deteriorated, the server 11 can receive the inquiry from each of the client terminals 20a, 20b with the same cycle at the same time. However, when the value of T increases, and the user of the client terminal performs various kinds of operation with regard to the playback, this results in a longer response period which is a time it takes to perform the content control according to the operation. As described above, when the condition that the value of the communication delay da updated in step S3 is less than the initial value of T is satisfied, the inquiry reception cycle adjusting means 121 returns the value of T back to the initial value, so that this can reduce the response period in response to an operation when the communication state recovers back to preferable state.

In each of the exemplary embodiments explained above, the time synchronization means 108, 206 may receive time information based on an atomic clock by way of radio wave, and may synchronize the time of the clock of the device thereof with the time indicated by the time information.

Figure 15:
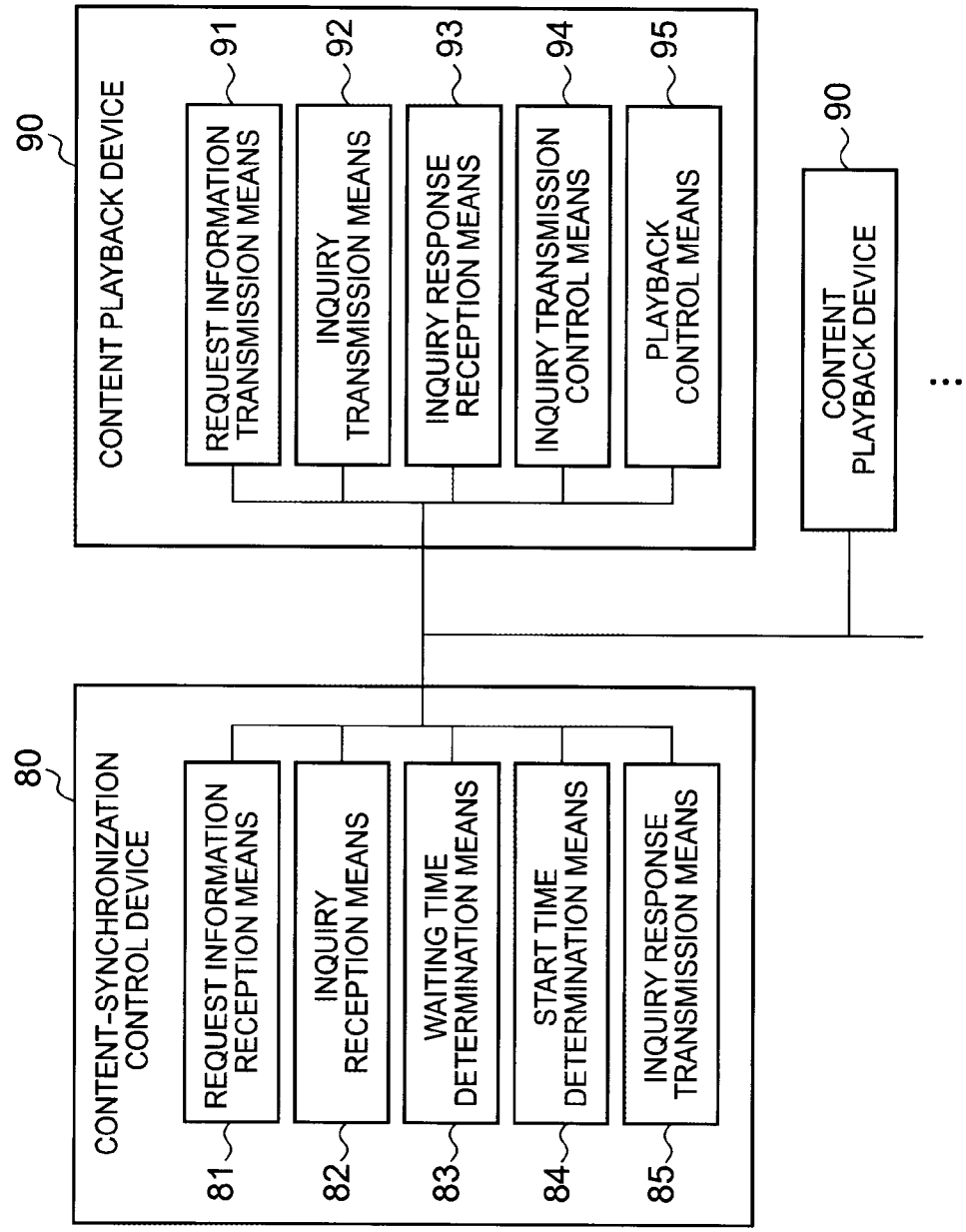
FIG. 15 It depicts a block diagram illustrating a minimum configuration of a content synchronization system of the present invention.
Figure 16:
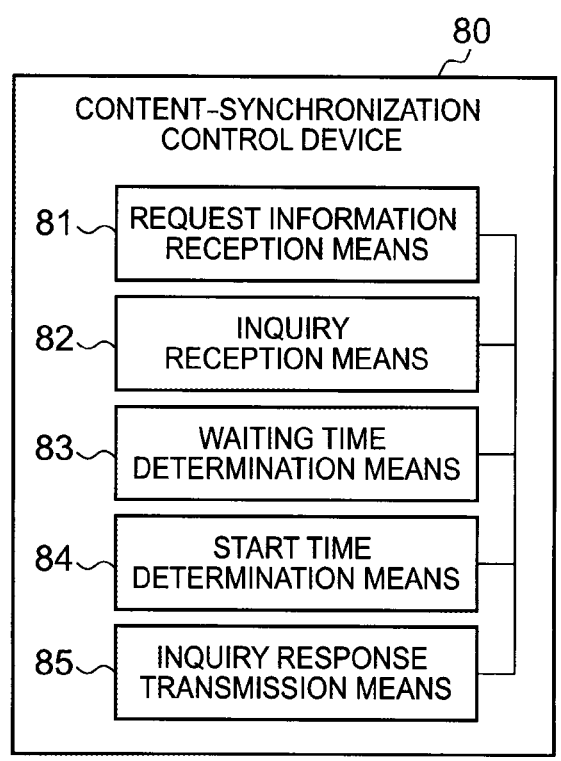
FIG. 16 It depicts a block diagram illustrating a minimum configuration of a content-synchronization control device of the present invention.
Figure 17:
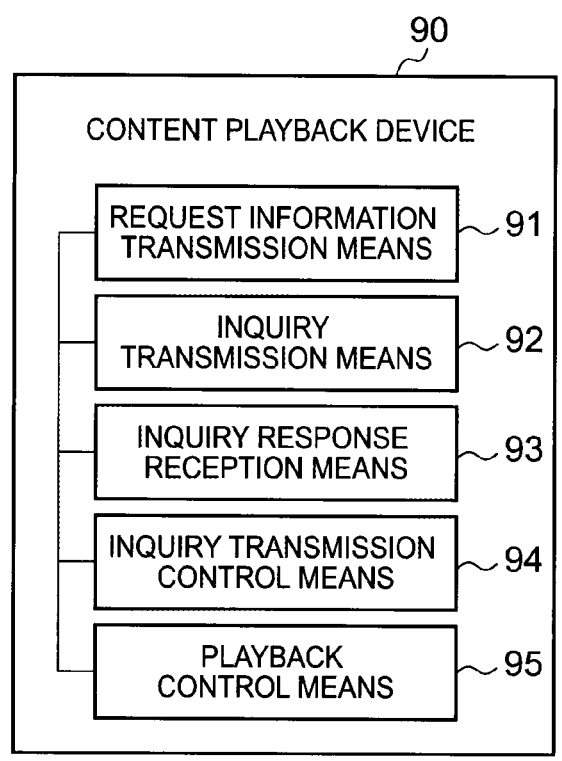
FIG. 17 It depicts a block diagram illustrating a minimum configuration of a content playback device of the present invention.

Subsequently, the minimum configuration of the present invention will be explained. FIG. 15 is a block diagram illustrating a minimum configuration of a content synchronization system of the present invention. FIG. 16 is a block diagram illustrating a minimum configuration of a content-synchronization control device of the present invention. FIG. 17 is a block diagram illustrating a minimum configuration of a content playback device of the present invention. In FIGS. 16 and 17, the same elements as those of the elements indicated in FIG. 15 are denoted with the same reference numerals as those of FIG. 15.

The content synchronization system of the present invention includes multiple content playback devices 90 for playing contents and a content-synchronization control device 80 for synchronizing content control in the multiple content playback devices 90.

The content-synchronization control device 80 includes request information reception means 81, inquiry reception means 82, waiting time determination means 83, start time determination means 84, and inquiry response transmission means 85 (see FIGS. 15 and 16).

The request information reception means 81 (for example, control request reception means 105) receives, from each content playback device 90, request information (for example, playback control request) for requesting each content playback device 90 to execute a playback control command which is a command concerning playback control of contents in a synchronized manner.

The inquiry reception means 82 (for example, inquiry reception means 101) receives the inquiry for determining presence/absence of playback control command transmitted from each content playback device 90 to the content playback device.

The waiting time determination means 83 (for example, waiting time determination means 102) determines the waiting time from when the content playback device of the source of transmission of inquiry receives an inquiry response which is a response from the content-synchronization control device 80 in reply to the inquiry to when it transmits a subsequent inquiry so that the reception time of the inquiry transmitted from each content playback device 90 is at the same time, on the basis of the cycle reference value (for example, T) determined as a reference of the reception cycle of the inquiry.

In a case where when the inquiry reception means 82 receives the inquiry, the request information reception means 81 already received the request information and the start time of the content control with each content playback device according to the playback control command indicated by the request information is not yet determined, the start time determination means 84 (for example, control time determination means 106) determines the start time.

The inquiry response transmission means 85 (for example, inquiry response transmission means 103) transmits, to the content playback device, the inquiry response including the waiting time determined with regard to the content playback device of the source of transmission of inquiry. Then, in a case where when the inquiry reception means 82 receives the inquiry, the request information reception means 81 already received the request information and the start time is determined, the inquiry response transmission means 85 transmits the inquiry response including the playback control information including the information about the start time and the playback control command indicated by the request information.

The content playback device 90 includes request information transmission means 91, inquiry transmission means 92, inquiry response reception means 93, inquiry transmission control means 94, and playback control means 95.

The request information transmission means 91 (for example, control request transmission means 204) transmits the request information to the content-synchronization control device 80.

The inquiry transmission means 92 (for example, inquiry transmission means 201) transmits the inquiry to the content-synchronization control device 80.

The inquiry response reception means 93 receives the inquiry response transmitted by the inquiry response transmission means 85 in response to the inquiry.

The inquiry transmission control means 94 (for example, inquiry control means 203) causes the inquiry transmission means 92 to transmit a subsequent inquiry with timing according to the waiting time indicated by the inquiry response.

When the inquiry response includes the playback control information, the playback control means 95 (for example, playback control means 207) starts content control according to the playback control command indicated by the playback control information, at the start time indicated by the playback control information.

According to the above configuration, under HTTP, a content-synchronization control device can control each content playback device so that content control is synchronized in multiple content playback devices.

A part or all of the exemplary embodiments explained above can also be described as shown in the following Supplementary note, but it is not limited thereto.

(Supplementary note 1) A content synchronization system including a plurality of content playback devices configured to play a content and a content-synchronization control device for synchronizing content control with the plurality of content playback devices, wherein the content-synchronization control device includes a request information reception unit configured to receive, from each content playback device, request information for requesting each content playback device to execute a playback control command which is a command concerning playback control of the content in a synchronized manner, an inquiry reception unit configured to receive an inquiry for determining presence/absence of playback control command transmitted to the content playback device from each content playback device, a waiting time determination unit configured to determine a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry, a start time determination unit, wherein in a case where when the inquiry reception unit receives the inquiry, the request information reception unit already received the request information and the start time of the content control with each content playback device according to the playback control command indicated by the request information is not yet determined, the start time determination unit determines the start time, and an inquiry response transmission unit configured to transmit, to the content playback device, an inquiry response including the waiting time determined with regard to the content playback device of the source of transmission of inquiry, wherein in a case where when the inquiry reception unit receives the inquiry, the request information reception unit already received the request information and the start time is determined, the inquiry response transmission unit transmits the inquiry response including the playback control information including the information about the start time and the playback control command indicated by the request information, each content playback device includes: a request information transmission unit configured to transmit the request information to the content-synchronization control device; an inquiry transmission unit configured to transmit the inquiry to the content-synchronization control device; an inquiry response reception unit configured to receive an inquiry response transmitted by the inquiry response transmission unit in response to the inquiry, an inquiry transmission control unit configured to cause the inquiry transmission unit to transmit a subsequent inquiry with timing according to the waiting time indicated by the inquiry response, and a playback control unit, wherein when the inquiry response includes playback control information, the playback control unit starts the content control based on the playback control command indicated by the playback control information at the start time indicated by the playback control information.

(Supplementary note 2) The content synchronization system according to Supplementary note 1, wherein the content-synchronization control device includes a communication delay calculation unit configured to calculate a communication delay between the content-synchronization control device and the content playback device of the source of transmission of the inquiry when the inquiry reception unit receives the inquiry and a cycle reference value update unit configured to update a cycle reference value with a value larger than the communication delay under a condition that the communication delay is a value more than the cycle reference value.

(Supplementary note 3) The content synchronization system according to Supplementary note 2, wherein the cycle reference value update unit returns the cycle reference value back to an initial value under a condition that the communication delay calculated by the communication delay calculation unit becomes equal to or less than a predetermined value.

(Supplementary note 4) The content synchronization system according to Supplementary note 2 or 3, wherein the inquiry transmission unit of each content playback device incorporates, into the inquiry, information about an elapsed time from when the inquiry response is received to when the inquiry is transmitted, and transmits the inquiry, and the communication delay calculation unit of the content-synchronization control device calculates the communication delay concerning the content playback device of the source of transmission of inquiry by subtracting the elapsed time from the transmission interval of the inquiry response.

(Supplementary note 5) The content synchronization system according to any one of Supplementary notes 1 to 4, wherein when the inquiry reception unit receives the inquiry, the waiting time determination unit determines, as the start time, a time which is after the current time by at least a time corresponding to a maximum value of one-way communication time from the content-synchronization control device to each content playback device.

(Supplementary note 6) The content synchronization system according to any one of Supplementary notes 1 to 5, wherein the waiting time determination unit determines a waiting time so that the inquiry from the content playback device is received at a time when a period of integral multiplication of the cycle reference value has elapsed from a reference point in time defined in advance.

(Supplementary note 7) A content-synchronization control device includes a request information reception unit configured to receive, from each content playback device, request information for requesting each content playback device to execute a playback control command which is a command concerning playback control of the content in a synchronized manner, an inquiry reception unit configured to receive an inquiry for determining presence/absence of playback control command transmitted to the content playback device from each content playback device, a waiting time determination unit configured to determine a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry, a start time determination unit, wherein in a case where when the inquiry reception unit receives the inquiry, the request information reception unit already received the request information and the start time of the content control with each content playback device according to the playback control command indicated by the request information is not yet determined, the start time determination unit determines the start time, and an inquiry response transmission unit configured to transmit, to the content playback device, an inquiry response including the waiting time determined with regard to the content playback device of the source of transmission of inquiry, wherein in a case where when the inquiry reception unit receives the inquiry, the request information reception unit already received the request information and the start time is determined, the inquiry response transmission unit transmits the inquiry response including the playback control information including the information about the start time and the playback control command indicated by the request information.

(Supplementary note 8) The content-synchronization control device according to Supplementary note 7, including a communication delay calculation unit configured to calculate a communication delay between the content-synchronization control device and the content playback device of the source of transmission of the inquiry when the inquiry reception unit receives the inquiry, and a cycle reference value update unit configured to update a cycle reference value with a value larger than the communication delay under a condition that the communication delay is a value more than the cycle reference value.

(Supplementary note 9) A content playback device for playing a content, including a request information transmission unit configured to transmit request information for requesting each content playback device to execute a playback control command which is a command concerning playback control of the content in a synchronized manner, to the content-synchronization control device for synchronizing content control in a plurality of content playback devices, an inquiry transmission unit configured to transmit, to the content-synchronization control device, an inquiry for determining presence/absence of playback control command transmitted to the content playback device, an inquiry response reception unit configured to receive an inquiry response which is transmitted by the content-synchronization control device in response to the inquiry and which includes information about a waiting time after the inquiry response is received, an inquiry transmission control unit configured to cause the inquiry transmission unit to transmit a subsequent inquiry with timing according to the waiting time, and a playback control unit, wherein when the inquiry response includes the playback control command and the information about the start time of the content control according to the playback control command, the playback control unit starts the content control based on the playback control command indicated by the playback control information at the start time.

(Supplementary note 10) The content playback device according to Supplementary note 9, wherein the inquiry transmission unit incorporates, into the inquiry, information about an elapsed time from when the inquiry response is received to when the inquiry is transmitted, and transmits the inquiry to the content-synchronization control device.

This application claims priority based on Japanese Patent Application No. 2011-208492 filed on Sep. 26, 2011, and all the disclosure therein is incorporated herein by reference.

As described above, the invention of the present application has been explained with reference to the exemplary embodiments, but the invention of the present application is not limited to the above exemplary embodiments. The configuration and the details of the invention of the present application can be changed in various manners that can be understood by a person skilled in the art within the scope of the invention of the present application.

INDUSTRIAL APPLICABILITY

The present invention can be preferably applied to the purpose of synchronizing the content control in multiple content playback devices.

REFERENCE SIGNS LIST

10, 11 Server (Content-synchronization control device)
20, 20a, 20b Client terminal (Content playback device)
101 Inquiry reception means
102 Waiting time determination means
103 Inquiry response transmission means
104 Communication delay management means
105 Control request reception means
106 Control time determination means
107 Control information management means
108 Time synchronization means
109 Data memory means
110 Data transmission means
121 Inquiry reception cycle adjusting means
201 Inquiry transmission means
202 Inquiry response reception means
203 Inquiry control means
204 Control request transmission means
205 Playback means
206 Time synchronization means
207 Playback control means
208 Data reception means
209 Data accumulation means

The invention claimed is:

1. A content synchronization system comprising:
a plurality of content playback devices configured to play a content; and
a content-synchronization control device for synchronizing content control with the plurality of content playback devices,
wherein the content-synchronization control device comprises:
a request information reception unit configured to receive, from each content playback device, request information for requesting each content playback device to execute a playback control command which is a command concerning playback control of the content in a synchronized manner;
an inquiry reception unit configured to receive an inquiry for determining presence/absence of playback control command transmitted to the content playback device from each content playback device;
a waiting time determination unit configured to determine a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry;
a start time determination unit, wherein in a case where when the inquiry reception unit receives the inquiry, the request information reception unit already received the request information and the start time of the content control with each content playback device according to the playback control command indicated by the request information is not yet determined, the start time determination unit determines the start time; and an inquiry response transmission unit configured to transmit, to the content playback device, an inquiry response including the waiting time determined with regard to the content playback device of the source of transmission of inquiry, wherein in a case where when the inquiry reception unit receives the inquiry, the request information reception unit already received the request information and the start time is determined, the inquiry response transmission unit transmits the inquiry response including the playback control information including the information about the start time and the playback control command indicated by the request information, each content playback device comprises:

a request information transmission unit configured to transmit the request information to the content-synchronization control device;

an inquiry transmission unit configured to transmit the inquiry to the content-synchronization control device;

an inquiry response reception unit configured to receive an inquiry response transmitted by the inquiry response transmission unit in response to the inquiry;

an inquiry transmission control unit configured to cause the inquiry transmission unit to transmit a subsequent inquiry with timing according to the waiting time indicated by the inquiry response; and a playback control unit, wherein when the inquiry response includes playback control information, the playback control unit starts the content control based on the playback control command indicated by the playback control information at the start time indicated by the playback control information.

2. The content synchronization system according to claim 1, wherein the content-synchronization control device comprises:

a communication delay calculation unit configured to calculate a communication delay between the content-synchronization control device and the content playback device of the source of transmission of the inquiry when the inquiry reception unit receives the inquiry; and a cycle reference value update unit configured to update a cycle reference value with a value larger than the communication delay under a condition that the communication delay is a value more than the cycle reference value.

3. The content synchronization system according to claim 2, wherein the cycle reference value update unit returns the cycle reference value back to an initial value under a condition that the communication delay calculated by the communication delay calculation unit becomes equal to or less than a predetermined value.

4. The content synchronization system according to claim 2, wherein the inquiry transmission unit of each content playback device incorporates, into the inquiry, information about an elapsed time from when the inquiry response is received to when the inquiry is transmitted, and transmits the inquiry, and the communication delay calculation unit of the content-synchronization control device calculates the communication delay concerning the content playback device of the source of transmission of inquiry by subtracting the elapsed time from the transmission interval of the inquiry response.

5. The content synchronization system according to claim 1, wherein when the inquiry reception unit receives the inquiry, the waiting time determination unit determines, as the start time, a time which is after the current time by at least a time corresponding to a maximum value of one-way communication time from the content-synchronization control device to each content playback device.

6. The content synchronization system according to claim 1, wherein the waiting time determination unit determines a waiting time so that the inquiry from the content playback device is received at a time when a period of integral multiplication of the cycle reference value has elapsed from a reference point in time defined in advance.

7. A content-synchronization control device comprises:

a request information reception unit configured to receive, from each content playback device, request information for requesting each content playback device to execute a playback control command which is a command concerning playback control of the content in a synchronized manner;

an inquiry reception unit configured to receive an inquiry for determining presence/absence of playback control command transmitted to the content playback device from each content playback device;

a waiting time determination unit configured to determine a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry;

a start time determination unit, wherein in a case where when the inquiry reception unit receives the inquiry, the request information reception unit already received the request information and the start time of the content control with each content playback device according to the playback control command indicated by the request information is not yet determined, the start time determination unit determines the start time; and an inquiry response transmission unit configured to transmit, to the content playback device, an inquiry response including the waiting time determined with regard to the content playback device of the source of transmission of inquiry, wherein in a case where when the inquiry reception unit receives the inquiry, the request information reception unit already received the request information and the start time is determined, the inquiry response transmission unit transmits the inquiry response including the playback control information including the information about the start time and the playback control command indicated by the request information.

8. The content-synchronization control device according to claim 7, comprising:

a communication delay calculation unit configured to calculate a communication delay between the content-synchronization control device and the content playback device of the source of transmission of the inquiry when the inquiry reception unit receives the inquiry; and a cycle reference value update unit configured to update a cycle reference value with a value larger than the communication delay under a condition that the communication delay is a value more than the cycle reference value.

9. A content playback device for playing a content, comprising:
a request information transmission unit configured to transmit request information for requesting each content playback device to execute a playback control command which is a command concerning playback control of the content in a synchronized manner, to the content-synchronization control device for synchronizing content control in a plurality of content playback devices;
an inquiry transmission unit configured to transmit, to the content-synchronization control device, an inquiry for determining presence/absence of playback control command transmitted to the content playback device;
an inquiry response reception unit configured to receive an inquiry response which is transmitted by the content-synchronization control device in response to the inquiry and which includes information about a waiting time after the inquiry response is received;
an inquiry transmission control unit configured to cause the inquiry transmission unit to transmit a subsequent inquiry with timing according to the waiting time; and
a playback control unit, wherein when the inquiry response includes the playback control command and the information about the start time of the content control according to the playback control command, the playback control unit starts the content control based on the playback control command at the start time.

10. The content playback device according to claim 9, wherein the inquiry transmission unit incorporates, into the inquiry, information about an elapsed time from when the inquiry response is received to when the inquiry is transmitted, and transmits the inquiry to the content-synchronization control device.

11. A content synchronization method in which:
when any one of a plurality of content playback devices for playing a content transmits request information for requesting each content playback device to execute a playback control command which is a command concerning playback control of the content in a synchronized manner, a content-synchronization control device for synchronizing content control with the plurality of content playback devices receives the request information from each content playback device;
each content playback device transmits, to the content-synchronization control device, an inquiry for determining presence/absence of playback control command transmitted to the content playback device;
when the content-synchronization control device receives an inquiry, the content-synchronization control device determines a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry;
in a case where when the content-synchronization control device receives the inquiry, the content-synchronization control device already received the request information and the start time of the content control with each content playback device according to the playback control command indicated by the request information is not yet determined, the content-synchronization control device determines the start time;
the content-synchronization control device transmits, to the content playback device of the source of transmission of inquiry, an inquiry response including the waiting time;
in a case where when the content-synchronization control device receives the inquiry, the content-synchronization control device already received the request information and the start time is determined, the content-synchronization control device transmits the inquiry response including the playback control information including the information about the start time and the playback control command indicated by the request information, when the inquiry response is transmitted;
when each content playback device transmits the inquiry and thereafter receives the inquiry response corresponding to the inquiry from the content-synchronization control device, the content playback device transmits a subsequent inquiry with timing according to the waiting time indicated by the inquiry response; and
when the inquiry response includes the playback control information, each content playback device starts the content control based on the playback control command indicated by the playback control information at the start time indicated by the playback control information.

12. The content synchronization method according to claim 11, wherein the content-synchronization control device calculates a communication delay between the content-synchronization control device and the content playback device of the source of transmission of the inquiry when the inquiry is received,
the content-synchronization control device updates a cycle reference value with a value larger than the communication delay under a condition that the communication delay is a value more than the cycle reference value.

13. A content-synchronization control method in which:
when any one of a plurality of content playback devices for playing a content transmits request information for requesting each content playback device to execute a playback control command which is a command concerning playback control of the content in a synchronized manner, a content-synchronization control device for synchronizing content control with the plurality of content playback devices receives the request information;
wherein the content-synchronization control device:
receives an inquiry for determining presence/absence of playback control command transmitted to the content playback device from each content playback device;
determines a waiting time from when the content playback device of the source of transmission of inquiry receives an inquiry response which is a response from the content-synchronization control device in reply to the inquiry to when it transmits a subsequent inquiry so that the reception time of the inquiry transmitted from each content playback device is at the same time, on the basis of a cycle reference value determined as a reference of a reception cycle of the inquiry;
determines the start time in a case where when the inquiry is received, the request information is already received and the start time of the content control with each content playback device according to the playback control command indicated by the request information is not yet determined; and
transmits an inquiry response including the waiting time to the content playback device of the source of transmission of inquiry, wherein in a case where when the content-synchronization control device receives the inquiry, the content-synchronization control device already received the request information and the start time is determined, the content-synchronization control device transmits the inquiry response including the playback control information including the information about the start time and the playback control command indicated by the request information, when the inquiry response is transmitted.

14. The content-synchronization control method according to claim 13, wherein the content-synchronization control device calculates a communication delay between the content-synchronization control device and the content playback device of the source of transmission of the inquiry when the inquiry is received, the content-synchronization control device updates a cycle reference value with a value larger than the communication delay under a condition that the communication delay is a value more than the cycle reference value.

15. A content playback method, wherein a content playback device for playing a content:

transmits request information for requesting each content playback device to execute a playback control command which is a command concerning playback control of the content in a synchronized manner, to the content-synchronization control device for synchronizing content control in a plurality of content playback devices;

transmits, to the content-synchronization control device, an inquiry for determining presence/absence of playback control command transmitted to the content playback device;

receives an inquiry response which is transmitted by the content-synchronization control device in response to the inquiry and which includes information about a waiting time after the inquiry response is received;

transmitting a subsequent inquiry with timing according to the waiting time; and when the inquiry response includes the playback control command and the information about the start time of the content control according to the playback control command, the content playback device starts the content control based on the playback control command at the start time.

16. The content playback method according to claim 15, wherein the content playback device incorporates, into the inquiry, information about an elapsed time from when the inquiry response is received to when the inquiry is transmitted, and transmits the inquiry to the content-synchronization control device.

17. A non-transitory computer-readable recording medium in which a content-synchronization control program is recorded, the content-synchronization control program causing a computer to perform:

request information reception processing for receiving, from each content playback device, request information for requesting each content playback device to execute a playback control command which is a command concerning playback control of the content in a synchronized manner;

inquiry reception processing for receiving an inquiry for determining presence/absence of playback control command transmitted to the content playback device from each content playback device;

waiting time determination processing for determining a waiting time from when the content playback device of the source of transmission of inquiry receives an inquiry response which is a response from the computer in reply to the inquiry to when it transmits a subsequent inquiry so that the reception time of the inquiry transmitted from each content playback device is at the same time, on the basis of a cycle reference value determined as a reference of a reception cycle of the inquiry;

start time determination processing, wherein in a case where when the inquiry is received, the request information is already received and the start time of the content control with each content playback device according to the playback control command indicated by the request information is not yet determined, determining the start time; and inquiry response transmission processing for transmitting, to the content playback device, an inquiry response including the waiting time determined with regard to the content playback device of the source of transmission of inquiry, wherein, inquiry response transmission processing, in a case where when the inquiry is received, the request information is already received and the start time is determined, the inquiry response including the playback control information including the information about the start time and the playback control command indicated by the request information is transmitted.

18. A non-transitory computer-readable recording medium in which a content playback program is recorded, the content playback program for causing a computer to execute:

request information transmission processing for transmitting, to the content synchronization control device for synchronizing content control in a plurality of computers, request information for requesting each content playback device to execute a playback control command which is a command concerning playback control of the content in a synchronized manner in the plurality of computers;

inquiry transmission processing for transmitting an inquiry for determining presence/absence of playback control command transmitted to the computer;

inquiry response reception processing for receiving an inquiry response which is transmitted by the content-synchronization control device in response to the inquiry and which includes information about the waiting time after the inquiry response reception;

processing for transmitting the inquiry again to the content-synchronization control device with timing according to the waiting time; and playback control processing, wherein when the inquiry response includes the playback control command and the information about the start time of the content control according to the playback control command, the content control based on the playback control command is started at the start time.

* * * * *